United States Patent
Feichtenschlager et al.

(10) Patent No.: US 10,577,471 B2
(45) Date of Patent: Mar. 3, 2020

(54) METHOD FOR CURING CURABLE COMPOSITIONS

(71) Applicant: BASF SE, Ludwigshafen (DE)

(72) Inventors: Bernhard Feichtenschlager, Traunstein (DE); Alfons Smeets, Seebruck (DE); Bernd Bruchmann, Freinsheim (DE); Hans-Josef Thomas, Korschenbroich (DE); Olivier Fleischel, Eckbolsheim (FR)

(73) Assignee: BASF SE, Ludwigshafen (DE)

( * ) Notice: Subject to any disclaimer, the term of this patent is extended or adjusted under 35 U.S.C. 154(b) by 294 days.

(21) Appl. No.: 15/515,884

(22) PCT Filed: Aug. 6, 2015

(86) PCT No.: PCT/EP2015/068137
§ 371 (c)(1),
(2) Date: Mar. 30, 2017

(87) PCT Pub. No.: WO2016/050398
PCT Pub. Date: Apr. 7, 2016

(65) Prior Publication Data
US 2017/0306118 A1  Oct. 26, 2017
US 2018/0148554 A9  May 31, 2018

(30) Foreign Application Priority Data

Oct. 1, 2014  (EP) ..................................... 14187375

(51) Int. Cl.
*C08J 5/24* (2006.01)
*C08J 5/04* (2006.01)
*C08J 3/24* (2006.01)
*C09J 133/06* (2006.01)

(52) U.S. Cl.
CPC ............... *C08J 5/24* (2013.01); *C08J 3/247* (2013.01); *C08J 5/042* (2013.01); *C08J 5/043* (2013.01); *C08J 2361/00* (2013.01); *C08J 2367/06* (2013.01); *C09J 133/064* (2013.01)

(58) Field of Classification Search
None
See application file for complete search history.

(56) References Cited

U.S. PATENT DOCUMENTS

| 4,234,676 A * | 11/1980 | Hein ..................... C08F 291/18 |
| | | 427/495 |
| 5,380,901 A | 1/1995 | Antonucci et al. |
| 2012/0129971 A1* | 5/2012 | Klok ....................... C08G 2/00 |
| | | 522/166 |

FOREIGN PATENT DOCUMENTS

| DE | 19618720 A1 | 11/1996 |
| DE | 19957900 A1 | 6/2001 |
| EP | 0007508 A2 | 2/1980 |
| EP | 0057474 A2 | 8/1982 |
| EP | 0495751 A1 | 7/1992 |
| EP | 0615980 A2 | 9/1994 |
| EP | 2287229 A1 | 2/2011 |
| EP | 1275668 B1 | 5/2011 |
| WO | 9828252 A1 | 7/1998 |
| WO | 2005057286 A1 | 6/2005 |
| WO | 2011006947 A1 | 1/2011 |
| WO | 2011141424 A1 | 11/2011 |
| WO | 2012126695 A1 | 9/2012 |
| WO | 2014152850 A1 | 9/2014 |
| WO | 2015067478 A1 | 5/2015 |

OTHER PUBLICATIONS

A.K. O'Brian, N.B. Cramer, and C.N. Bowman describe, in "Oxygen inhibition in thiol-acrylate photopolymerizations", J. Polym. Sci., Part A: Polym. Chem. 2006, 44, 2007-2014.
Analytical Handbook, "Gel-Permeations-Chromatographic von Polymeren," Bruessau, vol. 4, pp. 433 to 442, Berlin 1984. (No translation available).
Ullmann's Encyclopedia of Industrial Chemistry, 5th Edition, vol. 21A, Eds. Elvers et al., pp. 227-249.
H. Frey et al., Acta Polym. 1997, 48, 30-35.
Advances in Polymer Science, vol. 14, Springer Berlin 197 (Cover page and contents), 2 pages.
K. K. Dietliker, Chemistry and Technology of UV- and EB-Formulation for Coatings, Inks and Paints, vol. 3; Photoinitiators for Free Radical and Cationic Polymerization, P. K. T. Oldring (eds.), SITA Technology Ltd (Cover page and contents), 12 pages.
International Search Report issued in PCT/EP2015/068137 dated Dec. 14, 2015.

* cited by examiner

*Primary Examiner* — Katie L. Hammer
(74) *Attorney, Agent, or Firm* — Armstrong Teasdale LLP

(57) ABSTRACT

The invention relates to a process for the curing of latently reactive, heat-curable compositions which do not harden at room temperature. The composition includes a polymer obtainable via reaction of certain compounds having two aldehyde groups with polyacrylate compounds having two or more acrylate groups, and also a compound which bears at least two thiol groups.

18 Claims, No Drawings

METHOD FOR CURING CURABLE COMPOSITIONS

CROSS-REFERENCE TO RELATED APPLICATIONS

This application is a U.S. National Phase Application of PCT/EP2015/068137, filed Aug. 6, 2015, which claims the benefit of priority to EP Application No. 14187375.2, filed Oct. 1, 2014, the contents of which are hereby expressly incorporated by reference in their entirety.

The invention relates to a process for the curing of preferably latently reactive, heat-curable compositions which do not harden at room temperature. The composition comprises a polymer obtainable via reaction of certain compounds having two aldehyde groups with polyacrylate compounds having two or more acrylate groups, and also a compound which bears at least two thiol groups.

Plastics moldings are frequently produced from thermosets and elastomers via what are known as infusion techniques, for example transfer molding, also called resin transfer molding (RTM). The flowable molding composition here is injected by means of pistons from a mostly heated upstream chamber by way of runners into the mold, in which it hardens with exposure to heat and pressure. Formaldehyde resins (e.g. phenolics, melamine resins) and reactive resins (e.g. polyester resins or epoxy resins) with small filler particles, and elastomer, optionally in combination with fibers, can be used as molding composition. At the beginning of a cycle the upstream chamber comprises a metered quantity of preplastified molding composition. The mold is first closed. The molding composition is then injected into the mold, and allowed to remain in the mold for a certain time. During this time, known as residence time, the molding composition undergoes reaction or vulcanization. This residence time is dependent on various factors (resin type, filler, processing pressure, and processing temperature). Once the residence time has expired, the mold can be opened. The charge of molding composition is now solid (hardened), and is now described as a molding. This can now be demolded. If long fibers or semifinished fiber products (prewovens/preform) are to be processed, these are inserted into the mold in advance, and the molding composition is injected around same. Injection resins used are resins with the lowest possible viscosity. The resistance to flow when the material flows through the mold thus remains low, and pressure differences required for the charging of the material are thus smaller. Known reactive resins for RTM processes (injection resins) are usually composed of a resin component and of a hardener component. Low-reactivity resin systems can be mixed before infusion. When high-reactivity resin systems are used, mixing of resin and hardener must be delayed until the material is actually in the infusion line or in the mold. Relatively low cycle times can thus be achieved. Processes in which the injection resin components are not mixed until immediately before injection are known as RIM processes (reaction injection molding).

Infusion techniques such as transfer molding, in particular what is known as resin transfer molding (RTM), ideally require a system with maximal processing time (maximum pot life), so as to provide ideal charging of material to the mold, and ideal wetting of the inserted fibers. The system should then harden in the shortest possible time, if possible "at the press of a button", in order to minimize cycle time. The prior art mainly uses epoxy fiber systems. However, the epoxy resins usually used in those processes exhibit a relatively flat hardening profile, i.e. relatively low temperature dependency of hardening rate. Systems with steeper hardening profile are desirable, i.e. with relatively high temperature dependency of hardening rate. Many epoxy systems are moreover based on bisphenol A, which has certain associated risks, and attempts are increasingly being made to find other bisphenol-A-free alternatives as replacement epoxy in RTM processes. Curable epoxy resin systems are described by way of example in EP 2287229 A1.

Reactive mixtures made of acrylates and thiol compounds are known from EP 1275668. The mixtures here are mixed for immediate reaction, with no intention of storage or storage capability.

A. K. O'Brian, N. B. Cramer, and C. N. Bowman describe, in "Oxygen inhibition in thiol-acrylate photopolymerizations", J. Polym. Sci., Part A: Polym. Chem. 2006, 44, 2007-2014, the effect of the presence of oxygen ($O_2$) on the copolymerization of acrylates with thiols in bulk. For a given concentration of thiol functionalities, higher-functionality thiols lead to faster polymerization, and this increases the difficulty of stabilizing the system.

A known coating system that remains substantially unaffected by the presence of oxygen in the curing process comprises two-component epoxy resins. However, these frequently require toxic amines for the curing process.

WO 2012/126695 describes storage-stable mixtures made of polyacrylates and of polythiols. The mixtures described have satisfactory stability in storage, but the resultant coatings have inadequate adhesion to surfaces.

WO 2005/057286 discloses $\alpha$-(1'-hydroxyalkyl)acrylates obtained via the reaction of di- or polyacrylates with aldehydes, or di- or polyaldehydes with monoacrylates. This type of reaction is also known as a Baylis-Hillman reaction. These products are curable via radiation curing or via reaction with isocyanates in a dual-cure reaction.

WO 2014/152850 describes highly functionalized polymers produced from Baylis-Hillman adducts.

WO 2011/141424 discloses branched polymers (S) having hydroxy groups and acrylate groups, where said polymers have $\alpha$-(1'-hydroxyalkyl)acrylate groups, obtainable via reaction of at least one carbonyl compound (A) selected from the group consisting of carbonyl compounds (Ax) having more than two carbonyl groups, and dicarbonyl compounds (A2) having precisely two carbonyl groups, where the carbonyl groups not only in (A2) but also in (Ax) are in each case selected mutually independently from the group consisting of aldehyde groups and keto groups, and with at least one acrylate compound (B) selected from the group consisting of acrylate compounds (By) having more than two acrylate groups and diacrylate compounds (B2), with the proviso that the average functionality of the compounds (A) comprising carbonyl groups and/or the average functionality of the compounds (B) comprising acrylate groups is more than 2. The disclosure also comprises the curing of polymers of this type via radiation curing or dual-cure curing.

It was an object of the present invention to find a suitable system (in particular for transfer molding processes, for example RTM processes) with a steeper hardening profile, i.e. with relatively high temperature dependency of hardening rate, where ideally said system exhibits no, or only very slow, hardening at room temperature, and has the longest possible pot life, and exhibits the fastest possible hardening at a moderately elevated temperature. The formulation should moreover be, as far as possible, free from bisphenol A, but nevertheless exhibit performance levels comparable with those of known epoxy systems in RTM processes.

The object was achieved via a process for the curing of curable compositions where
at least one heat-curable composition is provided, and
the composition is hardened by heating to temperatures greater than or equal to 60° C.,
where the curable composition comprises at least the following constituents:
(a) at least one polymer (S) obtainable via reaction of at least one compound having two aldehyde groups and of at least one acrylate compound (B) selected from the group consisting of acrylate compounds having more than two acrylate groups (By) and diacrylate compounds (B2),
where the at least one compound having two aldehyde groups is an aromatic dialdehyde with molecular structure where the bonds to the two aldehyde groups are at an angle to one another,
(b) optionally at least one nonpolymeric compound (S1) having an α-(1'-hydroxyalkyl)acrylate group or at least one nonpolymeric compound (S2) having two or more α-(1'-hydroxyalkyl)acrylate groups,
(c) at least one compound (C) which bears at least two thiol groups,
(d) optionally at least one reactive diluent (D) with number-average molar mass $M_n$ that is preferably less than 1000 g/mol, and preferably having at least two (meth)acrylate groups,
(e) optionally at least one catalyst (E) which can accelerate the addition reaction between thiol groups and acrylate groups, and
(f) optionally at least one photoinitiator (F).

The polymer (S) can have been produced not only from the aromatic dialdehyde having molecular structure where the bonds to the two aldehyde groups are at an angle to one another but also from one or more other compounds which differ therefrom and which have one, two, or more aldehyde groups.

Unlike the polymers (S), the compounds (S1) and (S2) are generally not polymers.

Room temperature means 23° C. unless explicitly otherwise stated. The curable composition is preferably latently reactive, i.e. does not harden at room temperature. A latently reactive composition that does not harden at room temperature is a composition which within a period of 4 h at room temperature exhibits a viscosity increase of less than 100 000 mPa s, preferably less than 10 000 mPa s, particularly preferably less than 5000 mPa s. Viscosity can be determined by using a rotary cone-on-plate viscometer (e.g. "MCR 301" rheometer from Anton Paar, measurement system CP25-1-SN12203) at 23° C., constant shear rate 1 s$^{-1}$, gap width d=0.05 mm.

It is preferable here that the latently reactive composition does not undergo curing in bulk to give a tack-free material within a period of 16 hours at room temperature, i.e. that after 16 h it still retains at least some residual tack. The following laboratory method can be used to test whether a material is tack-free:

Once the reactive components have been mixed, the residue is pierced by a wooden stick (kebab stick) at predefined intervals (which can be a few seconds, minutes, or hours, as required by the reactivity of the components). When resin no longer adheres to the wood after it has been removed, the mixture has hardened to give a track-free material.

However, it is preferable that within a few minutes at elevated temperature (e.g. within 60 minutes at 70° C., preferably within 5 minutes at 60° C.) the reactive or latently reactive composition hardens to give a tack-free material, i.e. has no residual detectable tack.

The stepped hardening profile can give shorter production cycles in the production of composite materials (e.g. for wind turbines) or during adhesive bonding (e.g. in automobile construction).

The curable composition comprises at least one polymer (S) obtainable via reaction of at least one compound having two or more aldehyde groups and of at least one acrylate compound (B) selected from the group consisting of acrylate compounds having more than two acrylate groups (By) and diacrylate compounds (B2).

The quantity of polymer (S) in the curable composition is preferably from 10 to 80% by weight, or from 20 to 75% by weight, or from 20 to 70% by weight, or from 40 to 75% by weight, or from 40 to 60% by weight.

The total quantity of optional nonpolymeric compounds (S1) having an α-(1'-hydroxyalkyl)acrylate group and optional nonpolymeric compounds (S2) having two or more α-(1'-hydroxyalkyl)acrylate groups in the curable composition is by way of example from 0 to 80% by weight, or from 10 to 80% by weight, or from 10 to 60% by weight, or from 20 to 70% by weight, particularly preferably from 40 to 60% by weight.

Among the optional compounds (S1) and (S2) which bear α-(1'-hydroxyalkyl)acrylate groups, a distinction is drawn between those compounds (S1) that bear precisely one α-(1'-hydroxy-alkyl)acrylate group, therefore being obtainable via reaction of a monoacrylate with a monocarbonyl compound (see below), and compounds (S2) having two α-(1'-hydroxyalkyl)acrylate groups, obtainable via reaction of a di- or polyfunctional acrylate with monocarbonyl compounds or via reaction of compounds having precisely one acrylate group with compounds having at least two carbonyl groups (see below). The compounds (S1) function here as low-molecular-weight monomers in the curable composition, contributing to the desired molecular-weight increase and thus to the avoidance of volatility of the individual components in the system, but not contributing to crosslinking, whereas (S2) and (S) lead to crosslinking of the curable composition because their functionality is at least 2, based on activated double bonds.

The polymer (S) can be produced via what is known as Baylis-Hillman reaction in the presence of a suitable catalyst from the aldehyde compound and the acrylate compound (B), and preferably comprises three or more α-(1'-hydroxyalkyl)acrylate groups, for example from 3 to 10, or from 3 to 6, or from 3 to 4 α-(1'-hydroxyalkyl)acrylate groups. The material can also be a mixture of compounds, the statistical average functionality of which is the required functionality.

The average functionality of polymer (S) and compounds S1 and S2 in relation to α-(1'-hydroxyalkyl)acrylate groups here is greater than 1, preferably from 1.1 to 10, particularly preferably from 1.1 to 8, very particularly preferably from 1.3 to 8, and specifically from 1.3 to 6.

The number-average molar mass $M_n$ of polymer (S), determined via gel permeation chromatography with tetrahydrofuran as eluent and polymethyl methacrylate (PMMA) as standard, can by way of example be up to 5000 g/mol, preferably from 200 to 3000 g/mol, particularly preferably from 250 to 2000 g/mol, and in particular from 300 to 1500 g/mol.

The polydispersity of the polymers (S) (quotient calculated from number-average molar mass $M_n$ and weight-average molar mass $M_w$) is generally from 1.1 to 30, preferably from 1.2 to 20, particularly preferably from 1.2 to 15, very particularly preferably up to 10. Specifically, polydispersity can be up to 5, and more specifically up to 3. The method for the determination of polydispersity is described in Analytiker Taschenbuch [Analytical Handbook] vol. 4, pp. 433 to 442, Berlin 1984.

Examples of these α-(1'-hydroxyalkyl)acrylates (S), (S1), and (S2) are compounds obtainable via reaction of a mono- or polyfunctional acrylate with a mono- or polyfunctional carbonyl compound. Examples of carbonyl compounds are aldehydes and ketones, preferably aldehydes.

The compounds (S1) are obtainable via reaction of a monofunctional acrylate (I) with a monofunctional carbonyl compound (II).

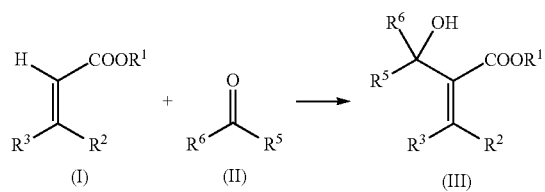

The compounds (S2) are obtainable via reaction of a di- or polyfunctional acrylate (IV) with a monofunctional carbonyl compound (II).

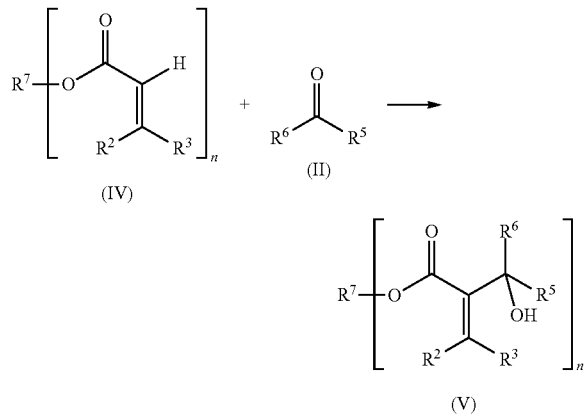

Other compounds (S2) are obtainable via reaction of a monofunctional acrylate (I) with a di- or polyfunctional carbonyl compound (VI).

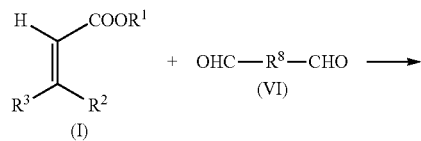

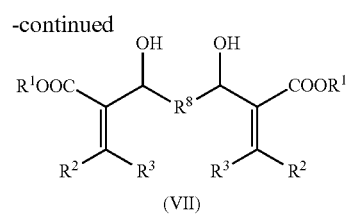

The definitions here are as follows:

$R^1$, $R^2$, and $R^3$ are mutually independently $C_1$-$C_{18}$-alkyl, or are $C_2$-$C_{18}$-alkyl, $C_2$-$C_{18}$-alkenyl, $C_6$-$C_{12}$-aryl, $C_5$-$C_{12}$-cycloalkyl optionally interrupted by one or more oxygen and/or sulfur atoms, and/or by one or more substituted or unsubstituted imino groups, or are a five- to six-membered heterocycle comprising oxygen, nitrogen, and/or sulfur atoms, where the moieties mentioned can in each case have aryl-, alkyl-, aryloxy-, alkyloxy-, heteroatom-, and/or heterocycle-substitution, $R^2$ and/or $R^3$ are alternatively hydrogen, or optionally aryl-, alkyl-, aryloxy-, alkyloxy-, heteroatom-, and/or heterocycle-substituted $C_1$-$C_{18}$-alkoxy, or —COOR$^4$, $R^2$ can also, together with $R^1$, form a ring, and in this case $R^2$ can be a carbonyl group, so that the group COOR$^1$ and $R^2$ together form an anhydride group —(CO)—O—(CO)—, $R^4$ is defined in the same way as $R^1$, but can differ therefrom, $R^5$ and $R^6$ are mutually independently hydrogen, $C_1$-$C_{18}$-alkyl, or are $C_2$-$C_{18}$-alkyl, $C_2$-$C_{18}$-alkenyl, $C_6$-$C_{12}$-aryl, $C_5$-$C_{12}$-cycloalkyl optionally interrupted by one or more oxygen and/or sulfur atoms, and/or by one or more substituted or unsubstituted imino groups, or are a five- to six-membered heterocycle comprising oxygen, nitrogen, and/or sulfur atoms, where the moieties mentioned can in each case have aryl-, alkyl-, aryloxy-, alkyloxy-, heteroatom-, and/or heterocycle-substitution, or can together form a ring, n is a positive integer from 2 to 10, $R^7$ is an n-valent organic moiety having from 1 to 50 carbon atoms which can be unsubstituted or can be halogen-, $C_1$-$C_8$-alkyl-, $C_2$-$C_8$-alkenyl-, carboxy-, carboxy-$C_1$-$C_8$-alkyl-, $C_1$-$C_{20}$-acyl-, $C_1$-$C_8$-alkoxy-, $C_6$-$C_{12}$-aryl-, hydroxy-, or hydroxy-substituted $C_1$-$C_8$-alkyl-substituted, and/or can have one or more —(CO)—, —O(CO)O—, —(NH)(CO)O—, —O(CO)(NH)—, —O(CO)—, or —(CO)O— groups, and $R^8$ is unsubstituted or halogen-, $C_1$-$C_8$-alkyl-, $C_2$-$C_8$-alkenyl-, carboxy-, carboxy-$C_1$-$C_8$-alkyl-, $C_1$-$C_{20}$-acyl-, $C_1$-$C_8$-alkoxy-, $C_6$-$C_{12}$-aryl-, hydroxy-, or hydroxy-substituted $C_1$-$C_8$-alkyl-substituted $C_6$-$C_{12}$-arylene, $C_3$-$C_{12}$-cycloalkylene, or $C_1$-$C_{20}$-alkylene, or $C_2$-$C_{20}$-alkylene interrupted by one or more oxygen and/or sulfur atoms, and/or by one or more substituted or unsubstituted imino groups, and/or by one or more —(CO)—, —O(CO)O—, —(NH)(CO)O—, —O(CO)(NH)—, —O(CO)—, or —(CO)O— groups, or a single bond.

The definitions here are as follows:

optionally aryl-, alkyl-, aryloxy-, alkyloxy-, heteroatom-, and/or heterocycle-substituted $C_1$-$C_{18}$-alkyl is by way of example methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hetadecyl, octadecyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl, or 6-ethoxyhexyl, optionally aryl-, alkyl-, aryloxy-, alkyloxy-, heteroatom-, and/or heterocycle-substituted $C_1$-$C_{18}$-alkoxy is by way of example methoxy, ethoxy, n-propyloxy, isopropyloxy, n-butyloxy, isobutyloxy, sec-butyloxy, tert-butyloxy, 6-hydroxy-1,4-dioxohexyl, 9-hydroxy-1,4,7-trioxononyl, 12-hydroxy-1,4,7,10-tetraoxododecyl, 6-methoxy-1,4-dioxohexyl, 9-methoxy-1,4,7-trioxononyl, 12-methoxy-1,4,7,10-tetraoxododecyl, 6-ethoxy-1,4-dioxohexyl, 9-ethoxy-1,4,7-trioxononyl, 12-ethoxy-1,4,7,10-tetraoxododecyl, 8-hydroxy-1,5-dioxooctyl, 12-hydroxy-1,5,9-trioxooctyl, 16-hydroxy-1,5,9,13-tetraoxohexadecyl, 8-methoxy-1,5-dioxooctyl, 12-methoxy-1,5,9-trioxooctyl, 16-methoxy-1,5,9,13-tetraoxohexadecyl, 8-ethoxy-1,5-dioxooctyl, 12-ethoxy-1,5,9-trioxooctyl, 16-ethoxy-1,5,9,13-tetraoxohexadecyl, 10-hydroxy-1,6-dioxodecyl, 15-hydroxy-1,6,11-trioxopentadecyl, 10-methoxy-1,6-dioxodecyl, 15-methoxy-1,6,11-trioxopentadecyl, 10-ethoxy-1,6-dioxodecyl, or 15-ethoxy-1,6,11-trioxopentadecyl, $C_2$-$C_{18}$-alkyl optionally interrupted by one or more oxygen and/or sulfur atoms, and/or by one or more substituted or unsubstituted imino groups is by way of example 5-hydroxy-3-oxapentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl, or 14-ethoxy-5,10-oxatetradecyl.

There is no restriction on the number of oxygen and/or sulfur atoms and/or imino groups. It is generally not more than 5 in the moiety, preferably not more than 4, and very particularly preferably not more than 3.

Between two heteroatoms there is/are also generally at least one carbon atom, preferably at least two.

Substituted and unsubstituted imino groups can by way of example be imino, methylimino, isopropylimino, n-butylimino, or tert-butylimino.

Further definitions are as follows:

optionally aryl-, alkyl-, aryloxy-, alkyloxy-, heteroatom-, and/or heterocycle-substituted $C_2$-$C_{18}$-alkenyl is by way of example vinyl, 1-propenyl, allyl, methallyl, 1,1-dimethylallyl, 2-butenyl, 2-hexenyl, octenyl, undecenyl, dodecenyl, octadecenyl, 2-phenylvinyl, 2-methoxyvinyl, 2-ethoxyvinyl, 2-methoxyallyl, 3-methoxyallyl, 2-ethoxyallyl, 3-ethoxyallyl, or 1- or 2-chlorovinyl, optionally aryl-, alkyl-, aryloxy-, alkyloxy-, heteroatom-, and/or heterocycle-substituted $C_6$-$C_{12}$-aryl is by way of example phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl, or ethoxymethylphenyl, optionally aryl-, alkyl-, aryloxy-, alkyloxy-, heteroatom-, and/or heterocycle-substituted $C_5$-$C_{12}$-cycloalkyl is by way of example cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl, or else a saturated or unsaturated bicyclic system, such as norbornyl or norbornenyl, a five- to six-membered heterocycle comprising oxygen, nitrogen, and/or sulfur atoms is by way of example furyl, thiophenyl, pyrryl, pyridyl, indolyl, benzoxazolyl, dioxolyl, dioxyl, benzimidazolyl, benzthiazolyl, dimethylpyridyl, methylquinolyl, dimethylpyrryl, methoxyfuryl, dimethoxypyridyl, difluoropyridyl, methylthiophenyl, isopropylthiophenyl, or tert-butylthiophenyl, and $C_1$ to $C_4$-alkyl is by way of example methyl, ethyl, propyl, isopropyl, n-butyl, sec-butyl or tert-butyl.

There is no restriction on the number of substituents in the stated moieties. In the case of moieties having from one to three carbon atoms the number of substituents is generally up to 3, preferably up to 2, and particularly preferably up to one. In the case of moieties having from four to six carbon atoms, the number of substituents is generally up to 4, preferably up to 3, and particularly preferably up to one. In the case of moieties having more than seven carbon atoms, the number of substituents is generally up to 6, preferably up to 4, and particularly preferably up to two.

It is preferable that $R^1$ is aryl-, alkyl-, aryloxy-, alkyloxy-, heteroatom- and/or heterocycle-substituted $C_1$-$C_{18}$-alkyl or $C_5$-$C_{12}$-cycloalkyl, for example methyl, ethyl, propyl, isopropyl, n-butyl, sec-butyl, tert-butyl, pentyl, hexyl, heptyl, octyl, 2-ethylhexyl, 2-hydroxyethyl, 2-hydroxypropyl, 3-hydroxypropyl, 4-hydroxybutyl, 6-hydroxyhexyl, cyclopentyl, cyclohexyl, cyclooctyl, cyclododecyl, methylcyclopentyl, dimethylcyclopentyl, methylcyclohexyl, dimethylcyclohexyl, norbornyl, or norbornenyl, and it is particularly preferable that $R^1$ is methyl, ethyl, propyl, isopropyl, n-butyl, sec-butyl, tert-butyl, pentyl, hexyl, heptyl, octyl, 2-ethylhexyl, 2-hydroxyethyl, 2-hydroxypropyl, 3-hydroxypropyl, 4-hydroxybutyl, or 6-hydroxyhexyl, and it is very particularly preferable that it is methyl, ethyl, propyl, isopropyl, n-butyl, sec-butyl, tert-butyl or 2-ethylhexyl, and in particular methyl, ethyl, n-butyl, or 2-ethylhexyl.

It is preferable that $R^2$ is hydrogen, aryl-, alkyl-, aryloxy-, alkyloxy-, heteroatom-, and/or heterocycle-substituted $C_1$-$C_{18}$-alkyl, or a carbonyl group bonded to $R^1$ such that the group COOR¹ and R² together form an anhydride group —(CO)—O—(CO)—, particularly hydrogen, methyl, ethyl, propyl, isopropyl, n-butyl, sec-butyl or tert-butyl, very particularly hydrogen or methyl, and in particular hydrogen.

It is preferable that $R^3$ is hydrogen, aryl-, alkyl-, aryloxy-, alkyloxy-, heteroatom-, and/or heterocycle-substituted $C_1$-$C_{18}$-alkyl, particularly hydrogen, or $C_1$-$C_4$-alkyl, which for the purposes of this document means methyl, ethyl, propyl, isopropyl, n-butyl, sec-butyl or tert-butyl, very particularly hydrogen or methyl, and in particular hydrogen.

It is preferable that $R^4$ is methyl, ethyl, propyl, isopropyl, n-butyl, sec-butyl or tert-butyl, particularly methyl or ethyl.

It is preferable that $R^5$ and $R^6$ are mutually independently hydrogen, aryl-, alkyl-, aryloxy-, alkyloxy-, heteroatom-, and/or heterocycle-substituted $C_1$-$C_{18}$-alkyl, $C_2$-$C_{18}$-alkenyl, $C_6$-$C_{12}$-aryl, or $C_5$-$C_{12}$-cycloalkyl, particularly hydrogen, aryl-, alkyl-, aryloxy-, alkyloxy-, heteroatom-, and/or heterocycle-substituted $C_1$-$C_{18}$-alkyl or $C_6$-$C_{12}$-aryl, very particularly hydrogen, methyl, ethyl, propyl, isopropyl, n-butyl, sec-butyl, tert-butyl, phenyl, benzyl, tolyl, o-, m-, or p-xylyl, 2-, 3-, or 4-methoxyphenyl, 2-, 3-, or 4-chlorophenyl, or 2-, 3-, or 4-nitrophenyl, and in particular hydrogen, methyl, ethyl, propyl, isopropyl or phenyl.

It is preferable that at least one of the two moieties $R^5$ and $R^6$ is hydrogen.

It is preferable that $R^7$ is an organic moiety derived from an n-hydric alcohol via removal of n hydroxy groups, for example derived from di- to decahydric alcohols, particularly derived from di- to hexahydric alcohols, very particularly derived from di- to tetrahydric alcohols, and in particular derived from di- to trihydric alcohols.

It is preferable that $R^8$ is unsubstituted or halogen-, $C_1$-$C_8$-alkyl-, $C_2$-$C_8$-alkenyl-, carboxy-, carboxy-$C_1$-$C_8$-alkyl-, $C_1$-$C_{20}$-acyl-, $C_1$-$C_8$-alkoxy-, $C_6$-$C_{12}$-aryl-, hydroxy-, or hydroxy-substituted $C_1$-$C_8$-alkyl-substituted $C_6$-$C_{12}$-arylene, $C_3$-$C_{12}$-cycloalkylene, or $C_1$-$C_{20}$-alkylene, or $C_2$-$C_{20}$-alkylene interrupted by one or more oxygen and/or sulfur atoms, and/or by one or more substituted or unsubstituted imino groups, and/or by one or more —(CO)—, —O(CO)O—, —(NH)(CO)O—, —O(CO)(NH)—, —O(CO)—, or —(CO)O groups, or a single bond, particularly unsubstituted or halogen-, $C_1$-$C_8$-alkyl-, $C_2$-$C_8$-alkenyl-, carboxy-, carboxy-$C_1$-$C_8$-alkyl-, $C_1$-$C_{20}$-acyl-, $C_1$-$C_8$-alkoxy-, $C_6$-$C_{12}$-aryl-, hydroxy-, or hydroxy-substituted $C_1$-$C_8$-alkyl-substituted $C_1$-$C_{20}$-alkylene, or a single bond, and very particularly unsubstituted or halogen-, $C_1$-$C_8$-alkyl-, $C_2$-$C_8$-alkenyl-, carboxy-, carboxy-$C_1$-$C_8$-alkyl-, $C_1$-$C_{20}$-acyl-, $C_1$-$C_8$-alkoxy-, $C_6$-$C_{12}$-aryl-, hydroxy-, or hydroxy-substituted $C_1$-$C_8$-alkyl-substituted $C_1$-$C_{20}$-alkylene.

Examples of compounds (I) are methyl acrylate, ethyl acrylate, n-propyl acrylate, isopropyl acrylate, n-butyl acrylate, sec-butyl acrylate, tert-butyl acrylate, 2-ethylhexyl acrylate, 2-hydroxyethyl acrylate, 5-hydroxy-3-oxapentyl acrylate, 2-hydroxypropyl acrylate, 3-hydroxypropyl acrylate, 4-hydroxybutyl acrylate, 6-hydroxyhexyl acrylate, dihydrodicyclopentadienyl acrylate, norbornyl acrylate, cyclohexyl acrylate, cyclopentyl acrylate, cyclododecyl acrylate, phenyl acrylate, methyl crotonate, ethyl crotonate, maleic anhydride, dimethyl maleate, diethyl maleate, di-n-butyl maleate, dimethyl fumarate, and diethyl fumarate.

Preferred compounds (I) are methyl acrylate, ethyl acrylate, n-propyl acrylate, isopropyl acrylate, n-butyl acrylate, sec-butyl acrylate, tert-butyl acrylate, and 2-ethylhexyl acrylate.

Particularly preferred compounds (I) are methyl acrylate, ethyl acrylate, n-butyl acrylate, and 2-ethylhexyl acrylate.

Examples of compounds (11) are formaldehyde, acetaldehyde, propionaldehyde, n-butyraldehyde, isobutyraldehyde, heptanal, nonanal, cyclopentylaldehyde, cyclohexylaldehyde, benzaldehyde, 3-chlorobenzaldehyde, 4-chlorobenzaldehyde, 3-hydroxybenzaldehyde, 4-hydroxybenzaldehyde, 3-methoxybenzaldehyde, 4-methylbenzaldehyde, phenylacetaldehyde, salicylaldehyde, chloral hydrate, 4-dimethylaminobenzaldehyde, furfural, 2-nitrobenzaldehyde, vanillin, anisaldehyde, cinnamaldehyde, pyridinecarbaldehyde, hydroxypivalaldehyde, dimethylolpropionaldehyde, dimethylolbutyraldehyde, trimethylolacetaldehyde, acetone, ethyl methyl ketone, diethyl ketone, methyl vinyl ketone, isobutyl methyl ketone, acetophenone, propiophenone, benzophenone, cyclopentanone, cyclohexanone, and cyclododecanone.

Preferred compounds (11) are the aldehydes listed, and particular preference is given to formaldehyde, acetaldehyde, propionaldehyde, n-butyraldehyde, isobutyraldehyde, benzaldehyde, 3-hydroxybenzaldehyde, 4-hydroxybenzaldehyde, hydroxypivalaldehyde, dimethylolpropionaldehyde, dimethylolbutyraldehyde, and trimethylolacetaldehyde, and very particular preference is given to formaldehyde, acetaldehyde, propionaldehyde, n-butyraldehyde, isobutyraldehyde, 3-hydroxybenzaldehyde, 4-hydroxybenzaldehyde, benzaldehyde, and dimethylolbutyraldehyde, and in particular formaldehyde and acetaldehyde.

In one preferred embodiment of the present invention, an aromatic aldehyde is used as compound (11), particularly benzaldehyde, 3-hydroxybenzaldehyde, or 4-hydroxybenzaldehyde, and very particularly benzaldehyde. Preference is in particular given to this embodiment when the coating compositions of the invention are to be used for adhesives.

For the production of non-ether-bridged Baylis-Hillman products it is advantageous to use aldehydes in free form, i.e. to suppress the formation of formals of said aldehydes of the formula $(R^5\text{—CHO})_w$, in which w is a positive integer, via use of suitable aldehydes and/or selection of suitable solvents. While in U.S. Pat. No. 5,380,901 the use of para-formaldehyde or para-formaldehyde/DMSO, in which there is no suppression of the formation of formals, gives ether-bridged systems throughout, it is advantageous to use aldehydes with a high proportion of lower formals, for example where w<20, preferably w<10, and particularly preferably w<5.

The proportion of said lower formals, based on the total quantity of aldehyde, should by way of example be at least 50%, preferably at least 60%, particularly preferably at least 70%, and very particularly preferably at least 80%.

This is achieved in the case of formaldehyde by way of example in that formaldehyde is used in the form of aqueous solutions of strength by way of example not more than 49%, and preferably up to 37%.

By using these measures it is possible to suppress ether-bridged Baylis-Hillman products. The proportion of said products is determined as molar proportion of the aldehyde equivalents in ether bridges (—CHR⁵—O—CHR⁵—) in the entirety of the Baylis-Hillman products, i.e. ether bridges and terminal —CHR⁵OH groups.

The ether bridges correspond to 2 molar equivalents of aldehyde R⁵—CHO, whereas the terminal —CHR⁵OH— groups correspond to one molar equivalent of aldehyde.

The proportions of the groups can be determined by way of example by way of NMR spectroscopy. In the case of formaldehyde in ¹H NMR spectra in CDCl₃, the CH₂—O—CH₂ group appears as singlet or, respectively, singlet split via allyl coupling, at about δ=4.22 ppm (see U.S. Pat. No. 5,380,901), and the CH₂OH group appears at about 4.30 ppm; in $^{13}$C NMR spectra in CDCl$_3$ the CH$_2$—O—CH$_2$ group appears at about δ=68.7 ppm, and the CH$_2$OH group appears at about 62.0 ppm.

The measures described above of the invention comprising the use of aldehydes with a small proportion of formals can generally reduce the proportion of ether bridges to 50% or less, preferably to 40% or less, particularly preferably to no more than 33%, very particularly preferably to no more than 25%, and in particular to no more than 15%.

In contrast to this, the proportion of ether bridges in the silicone diacrylate described in column 5 of U.S. Pat. No. 5,380,901, where n=2 and 95% of x=—CH$_2$OH (U.S. Pat. No. 5,380,901, column 5, lines 57-59), is about 69%. A high proportion of terminal OH groups is, however, advantageous in dual-cure curing for the reaction with groups reactive toward OH.

Examples of compounds (IV) are ethylene glycol diacrylate, 1,2-propanediol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentyl glycol diacrylate, 1,1-, 1,2-, 1,3-, and 1,4-cyclohexanedimethanol diacrylate, 1,2-, 1,3-, and 1,4-cyclohexanediol diacrylate, trimethylolpropane triacrylate, ditrimethylolpropane penta- and hexaacrylate, pentaerythritol tri- and tetraacrylate, glycerol di- and triacrylate, and also di- and polyacrylates of sugar alcohols, for example sorbitol, mannitol, diglycerol, threitol, erythritol, adonitol (ribitol), arabitol (lyxitol), xylitol, dulcitol (galactitol), maltitol or isomaltol, or of polyester polyols or polyetherols, polyTHF with molar mass from 162 to 2000 g/mol, poly-1,3-propanediol with molar mass from 134 to 1178 g/mol, polyethylene glycol with molar mass from 106 to 898 g/mol, and also urethane acrylates, and polycarbonate acrylates.

Other examples are acrylates of compounds of the formula (IVa) to (IVc),

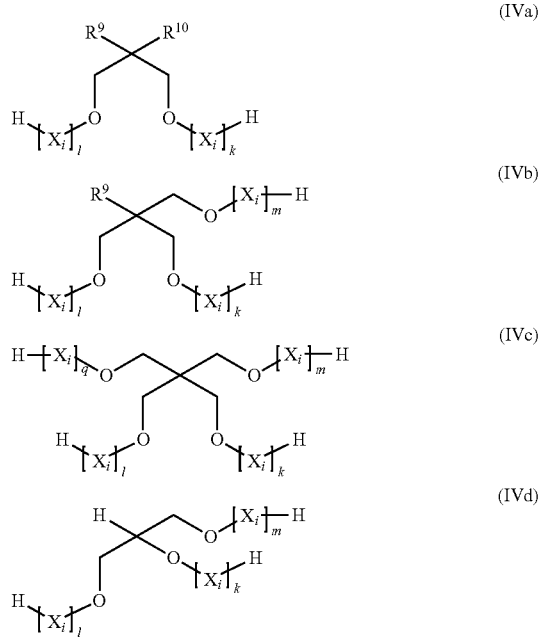

in which
R$^9$ and R$^{10}$ are mutually independently hydrogen or C$_1$-C$_{18}$-alkyl, k, l, m, and q are in each case mutually independently an integer from 1 to 10, preferably from 1 to 5, and particularly preferably from 1 to 3, and each X$_i$ for i=from 1 to k, from 1 to l, from 1 to m, and from 1 to q can be selected mutually independently from the group of —CH$_2$—CH$_2$—O—, —CH$_2$—CH(CH$_3$)—O—, —CH(CH$_3$)—CH$_2$—O—, —CH$_2$—C(CH$_3$)$_2$—O—, —C(CH$_3$)$_2$—CH$_2$—O—, —CH$_2$—CHVin-O—, —CHVin-CH$_2$—O—, —CH$_2$—CHPh-O— and —CHPh-CH$_2$—O—, preferably from the group of —CH$_2$—CH$_2$—O—, —CH$_2$—CH(CH$_3$)—O—, and —CH(CH$_3$)—CH$_2$—O—, and particularly preferably —CH$_2$—CH$_2$—O—, in which Ph is phenyl and Vin is vinyl.

It is preferable that these materials are acrylates of from singly to twenty-fold and particularly from three- to ten-fold ethoxylated, propoxylated, or mixed ethoxylated and propoxylated, and in particular exclusively ethoxylated neopentyl glycol, glycerol, trimethylolpropane, trimethylolethane, trimethylolmethane, or pentaerythritol.

Preferred compounds (IV) are ethylene glycol diacrylate, 1,2-propanediol diacrylate, 1,3-propanediol diacrylate, 1,4-butanediol diacrylate, 1,6-hexanediol diacrylate, trimethylolpropane triacrylate, pentaerythritol tetraacrylate, polyester polyol acrylates, polyetherol acrylates, and triacrylate of singly to twenty-fold ethoxylated trimethylolpropane, and also tetraacrylate of singly to twenty-fold ethoxylated pentaerythritol.

Particularly preferred compounds are 1,4-butanediol diacrylate, 1,6-hexanediol diacrylate, trimethylolpropane triacrylate, pentaerythritol tetraacrylate, and triacrylate of singly to twenty-fold ethoxylated trimethylolpropane, and also tetraacrylate of singly to twenty-fold ethoxylated pentaerythritol.

Polyester polyols are disclosed by way of example in Ullmanns Enzyklopädie der technischen Chemie [Ullmann's Encyclopedia of Industrial Chemistry], 4th edn., vol. 19, pp. 62 to 65. It is preferable to use polyester polyols obtained via reaction of dihydric alcohols with dibasic carboxylic acids. Instead of the free polycarboxylic acids it is also possible to use the corresponding polycarboxylic anhydrides or corresponding polycarboxylic esters of lower alcohols, or a mixture of these, for the production of the polyester polyols. The polycarboxylic acids can be aliphatic, cycloaliphatic, araliphatic, aromatic, or heterocyclic, and can optionally have substitution, for example by halogen atoms, and/or unsaturation. The following may be mentioned as examples here:

Oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid, and tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, isomers of these, and hydrogenation products, and also esterifiable derivatives, for example anhydrides and dialkyl esters, for example C$_1$-C$_4$-alkyl esters, preferably methyl, ethyl, or n-butyl esters, of the acids mentioned. Preference is given to dicarboxylic acids of the general formula HOOC—(CH$_2$)$_y$—COOH, where y is a number from 1 to 20, preferably an even number from 2 to 20, particularly preferably succinic acid, adipic acid, sebacic acid, and dodecanedicarboxylic acid.

The following polyhydric alcohols can be used for the production of the polyesterols: 1,2-propanediol, ethylene glycol, 2,2-dimethyl-1,2-ethanediol, 1,3-propanediol, 1,2- butanediol, 1,3-butanediol, 1,4-butanediol, 3-methylpentane-1,5-diol, 2-ethylhexane-1,3-diol, 2,4-diethyloctane-1,3-diol, 1,6-hexanediol, polyTHF with molar mass from 162 to 2000, poly-1,3-propanediol with molecular weight from 134 to 1178, poly-1,2-propanediol with molecular weight from 134 to 898, polyethylene glycol with molecular weight from 106 to 458, neopentyl glycol, neopentyl glycol hydroxypivalate, 2-ethyl-1,3-propanediol, 2-methyl-1,3-propanediol, 2,2-bis(4-hydroxycyclohexyl)propane, 1,1-, 1,2-, 1,3- and 1,4-cyclohexanedimethanol, 1,2-, 1,3-, and 1,4-cyclohexanediol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, or isomalt.

Preference is given to alcohols of the general formula HO—$(CH_2)_x$—OH, where x is a number from 1 to 20, preferably an even number from 2 to 20. Preference is given to ethylene glycol, butane-1,4-diol, hexane-1,6-diol, octane-1,8-diol, and dodecane-1,12-diol. Preference is further given to neopentyl glycol.

It is moreover also possible to use polycarbonate diols as by way of example can be obtained via reaction of phosgene with an excess of the low-molecular-weight alcohols mentioned as structural components for the polyester polyols.

Lactone-based polyesterdiols are also suitable, where these are homo- or copolymers of lactones, preferably products of an addition reaction of lactones onto suitable difunctional starter molecules, where said products have terminal hydroxy groups. Lactones that can be used are preferably those that derive from compounds of the general formula HO—$(CH_2)_z$—COOH, where z is a number from 1 to 20, and a H atom of a methylene unit can also have been replaced by a $C_1$-$C_4$-alkyl moiety. Examples are ε-caprolactone, β-propiolactone, gamma-butyrolactone, and/or methyl-ε-caprolactone, 4-hydroxybenzoic acid, 6-hydroxy-2-naphthalenic acid, and pivalolactone, and also mixtures of these. Examples of suitable starter components are the low-molecular-weight dihydric alcohols mentioned above as structural component for the polyester polyols. Particular preference is given to the corresponding polymers of ε-caprolactone. It is also possible to use lower polyesterdiols or polyetherdiols as starters for the production of the lactone polymers. Instead of the polymers of lactones, it is also possible to use the corresponding, chemically equivalent polycondensates of the hydroxycarboxylic acids corresponding to the lactones.

The compound (VI) is at least one, preferably precisely one, polyfunctional, preferably difunctional, carbonyl compound, specifically a diketone or dialdehyde, very specifically a dialdehyde. Among the dialdehydes, particular preference is given to those which at the carbon atom in the α-position with respect to the aldehyde function do not have any hydrogen atom that can be extracted by the base used.

Examples of compounds (VI) are glyoxal, malonaldehyde, succinaldehyde, glutaraldehyde, capronaldehyde, furan 2,5-dialdehyde, pyrrole 2,5-dialdehyde, pyridine 2,6-dialdehyde, phthalaldehyde, isophthalaldehyde, and terephthalaldehyde, particular preference being given to glyoxal, succinaldehyde, glutaraldehyde, isophthalaldehyde, and terephthalaldehyde.

Other possible compounds are condensates of formaldehyde, for example in the form of carbonyl-functionalized novolaks and lignin.

One preferred embodiment of the present invention, in particular for the production of the polymer (S) of component a), uses an aromatic aldehyde as compound (VI), particularly phthalaldehyde or isophthalaldehyde, or else a mixture of phthalaldehyde and/or isophthalaldehyde with monofunctional carbonyl compounds (II) and/or with di- or polyfunctional carbonyl compounds (VI). Particular preference is given to mixtures of phthalaldehyde and/or isophthalaldehyde with benzaldehyde and/or terephthalaldehyde. in particular with these and very particularly preferably isophthalaldehyde, or else a mixture of terephthalaldehyde with this.

Preference is further given to compounds of the formula (V) in which n is at least 3, preferably being 3 or 4. Very particular preference is given to those compounds in which the moiety $R^7$ derives from optionally alkoxylated trimethylolpropane or pentaerythritol. The simultaneous presence of acrylate and hydroxy groups gives these compounds particularly good suitability for dual-cure curing.

Component (S) can be produced by reacting at least one difunctional carbonyl compound (A2) and optionally at least one more than difunctional carbonyl compound (Ax) with at least one difunctional acrylate compound (B2) and/or at least one more than difunctional acrylate compound (By).

The following possible reactants lead to the component (S) of the invention:
1) at least one compound (A2), and at least one compound (B2),
2) at least one compound (A2), and at least one compound (Ax), and at least one compound (By),
3) at least one compound (A2), and at least one compound (Ax), and at least one compound (B2),
4) at least one compound (A2), and at least one compound (By),
5) at least one compound (A2), and at least one compound (Ax), and at least one compound (By), and at least one compound (B2),
6) at least one compound (By), and at least one compound (A2), and at least one compound (B2),
7) at least one compound (Ax), and at least one compound (By), and at least one compound (A2), and at least one compound (B2).

Among these, preference is given to the possible reactants 4), 6), and 1). A preferred embodiment of the present invention produces compounds (S) by using possible reactants 1), where at least one compound (A2) and at least one compound (B2) are reacted with one another.

The at least one carbonyl compound (Ax) having more than two carbonyl groups has a statistical average of more than two carbonyl groups, preferably at least 3, particularly preferably from 3 to 6, very particularly preferably from 3 to 5, in particular from 3 to 4, and specifically 3.

The number of these compounds (Ax) can be at least one, for example from one to four, preferably from one to three, particularly preferably from one to two, and very particularly preferably precisely one. The carbonyl groups here are aldehyde groups, but the compounds can also comprise additional keto groups. Preference is given to compounds having only aldehyde groups.

Bonding between these functional groups can be of any desired type, for example via aromatic, aliphatic, cycloaliphatic, or heteroaromatic groups or a combination thereof, preferably via aromatic groups.

Examples of preferred compounds (Ax) are aromatics substituted with three aldehyde groups, for example 1,2,3-, 1,2,4-, or 1,3,5-benzene trialdehyde, 2,4,6-pyridine trialdehyde, or hydroformylation products of alkane polyenes having an appropriate number of C=C double bonds, preferably alkane trienes. The average number of aldehyde groups in the mixture can be controlled via the number of C=C double bonds and hydroformylation. Products of this type are described by way of example in WO 98/28252, particularly at page 3, line 36 to page 11, line 44 in that document, and also in examples 1 to 9 described therein. A particularly preferred compound (Ax) is 1,3,5-benzene trialdehyde.

Starting materials (A2) used for the reaction optionally comprise at least one, for example from one to four, preferably from one to three, particularly preferably from one to two, and very particularly preferably precisely one, difunctional aldehyde compound(s) (dialdehyde(s)).

It is preferable that an aromatic hydrocarbon moiety bonds the two carbonyl groups to one another in the compound (A2). It is preferable that the dialdehyde compounds (A2) are compounds of the formula (VI)

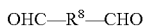

OHC—R$^8$—CHO

R$^8$ is preferably unsubstituted or halogen-, $C_1$-$C_5$-alkyl-, $C_2$-$C_8$-alkenyl-, carboxy-, carboxy-$C_1$-$C_8$-alkyl-, $C_1$-$C_{20}$-acyl-, $C_1$-$C_8$-alkoxy-, $C_6$-$C_{12}$-aryl-, hydroxy-, or hydroxy-substituted $C_1$-$C_8$-alkyl-substituted $C_6$-$C_{12}$-arylene.

At least one of the compounds (A2) is (in particular for the production of the polymer (S) of component a) an aromatic dialdehyde with molecular structure where the bonds to the two aldehyde groups are at an angle to one another. Aromatic dialdehydes of this type are compounds in which the two aldehyde groups are bonded to an aromatic ring, and the bonds by which the aldehyde groups are bonded to the aromatic ring have a nonlinear relationship to one another, i.e. form an angle differing from 0° and 180°. Preferred compounds (A2) are aromatic dialdehydes of this type selected from furan 2,5-dialdehyde, pyrrole 2,5-dialdehyde, pyridine 2,6-dialdehyde, phthalaldehyde, isophthalaldehyde, and mixtures of these, particular preference being given to isophthalaldehyde, phthalaldehyde, and mixture of these, and in particular to isophthalaldehyde alone as sole aromatic dialdehyde, or as sole dialdehyde compound (A2).

It is therefore preferable, for the production of the polymer (S), to use isophthalaldehyde as sole carbonyl compound, or isophthalaldehyde in combination with other carbonyl compounds, in particular with monofunctional carbonyl compounds (II) (preferably benzaldehyde) or with di- or polyfunctional carbonyl compounds (VI) (preferably terephthalaldehyde). If isophthalaldehyde is used in combination with other carbonyl compounds for the production of the polymer (S), the molar ratio of isophthalaldehyde to other carbonyl compounds, based on carbonyl functionality, is preferably from 0.5 to 2, in particular from 1 to 2.

The invention therefore also provides a process for the curing of curable compositions where
    at least one curable composition is provided, and
    the composition is hardened by heating to temperatures greater than or equal to 60° C.,
    where the curable composition comprises at least the following constituents:
    (a) at least one polymer (S) obtainable via reaction of at least one compound having two aldehyde groups selected from aromatic dialdehydes having molecular structure where the bonds to the two aldehyde groups are at an angle to one another (preferably phthalaldehyde, isophthalaldehyde, or a mixture of these) and of at least one acrylate compound (B) selected from the group consisting of acrylate compounds having more than two acrylate groups (By) and diacrylate compounds (B2), (b) optionally at least one nonpolymeric compound selected from compounds (S1) having an α-(1'-hydroxyalkyl)acrylate group and compounds (S2) having two or more α-(1'-hydroxyalkyl)acrylate groups,
    (c) at least one compound (C) which bears at least two thiol groups,
    (d) optionally at least one reactive diluent (D) with number-average molar mass $M_n$ that is less than 1000 g/mol, and having at least two (meth)acrylate groups,
    (e) optionally at least one catalyst (E) which can accelerate the addition reaction between thiol groups and acrylate groups, and
    (f) optionally at least one photoinitiator (F).

The polymer (S) can have been produced not only from the aromatic dialdehyde with molecular structure where the bonds to the two aldehyde groups are at an angle to one another but also from one or more other compounds differing therefrom having one, two or more aldehyde groups.

The at least one acrylate compound (By) having more than two acrylate groups has a statistical average of more than two acrylate groups, preferably at least 3, particularly preferably from 3 to 8, very particularly preferably from 3 to 6, in particular from 3 to 4, and specifically 3.

The number of compounds (By) here can be at least one, for example from one to four, preferably from one to three, particularly preferably from one to two, and very particularly preferably precisely one.

The acrylate compounds (By) correspond to the compounds described above of the formula (IV) with values of at least 3 for n. They can by way of example be acrylic esters of polyalcohols, for example of polyols, of polyetherols, of polyesterols, or of polyacrylate polyols, with the appropriate functionality. Suitable compounds (By) can therefore be polyether acrylates, polyester acrylates, acrylated polyacrylatols, or urethane acrylates with the desired functionality greater than 2.

It is preferable that these materials are acrylates of from singly to twenty-fold and particularly from three- to ten-fold ethoxylated, propoxylated, or mixed ethoxylated and propoxylated, and in particular exclusively ethoxylated neopentyl glycol, glycerol, trimethylolpropane, trimethylolethane, or pentaerythritol.

Preferred compounds (B2) are ethylene glycol diacrylate, 1,2-propanediol diacrylate, 1,3-propanediol diacrylate, 1,4-butanediol diacrylate, and 1,6-hexanediol diacrylate, and preferred compounds (By) are trimethylolpropane triacrylate, glycerol triacrylate, pentaerythritol tetraacrylate, and triacrylate of singly to twenty-fold ethoxylated trimethylolpropane, and also tetraacrylate of singly to twenty-fold ethoxylated pentaerythritol.

Particularly preferred compounds (B2) are 1,4-butanediol diacrylate and 1,6-hexanediol diacrylate, and particularly preferred compounds (By) are glycerol triacrylate, trimethylolpropane triacrylate, pentaerythritol tetraacrylate, and triacrylate of singly to twenty-fold ethoxylated trimethylolpropane, and also tetraacrylate of singly to twenty-fold ethoxylated pentaerythritol.

Another starting material that can optionally be used comprises at least one, for example from one to four, preferably from one to three, particularly preferably from one to two, and very particularly preferably precisely one, difunctional acrylate(s) (B2).

Examples of these compounds are the compounds described above of the formula (IV) where n=2.

Diacrylate compounds (B2) are any desired difunctional acrylates, preferably diacrylates of alkanediols or of cycloalkanediols, or else of lower polyalkylene glycols, preferably of polyethylene glycols or of polypropylene glycols, or—although less preferably—are difunctional acrylamides of diamines, preferably of linear or branched aliphatic or cycloaliphatic diamines.

Compounds (B2) are preferably those with molar mass below 400 g/mol, particularly preferably compounds with structural uniformity, i.e. those without any significant molar mass polydispersity.

The alkanediols can preferably be ethylene glycol, 2,2-dimethyl-1,2-ethanediol, 1,3-propanediol, 1,2-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, neopentyl glycol, 2-ethyl-1,3-propanediol or 2-methyl-1,3-propanediol. The cycloalkanediols can preferably be 2,2-bis(4-hydroxycyclohexyl)propane, 1,1-, 1,2-, 1,3-, and 1,4-cyclohexanedimethanol, 1,2-, 1,3-, or 1,4-cyclohexanediol. The polyalkylene glycols can preferably be polyethylene glycols, polypropylene glycols, poly-THF, or poly-1,3-propanediol. Particular preference is given to polyethylene glycols or polypropylene glycols in the form of mixture of the isomers. Among the polyalkylene glycols, preference is given to di- to pentamers.

The diamines are preferably linear or branched aliphatic or cycloaliphatic primary and/or secondary diamines, for example 1,2-diaminoethane, 1,2- or 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane, or piperazine.

Particularly preferred diacrylates (B2) are ethylene glycol diacrylate, 1,2-propanediol diacrylate, 1,3-propanediol diacrylate, 1,3-butanediol diacrylate, 1,4-butanediol diacrylate, 1,6-hexanediol diacrylate, diethylene glycol diacrylate, dipropylene glycol diacrylate, tripropylene glycol diacrylate, N,N'-bisacryloyl-1,2-diaminoethane, N,N'-bisacryloyl-1,6-diaminohexane, and N,N'-bisacryloylpiperazine. Very particularly preferred compounds are 1,4-butanediol diacrylate, 1,6-hexanediol diacrylate, dipropylene glycol diacrylate, and tripropylene glycol diacrylate.

The conduct of the Baylis-Hillman reaction is known per se to the person skilled in the art, and is the subject of many literature reviews.

The reaction can be carried out at a temperature from 0° C. to 100° C., preferably from 20 to 80° C., and particularly preferably from 25° C. to 60° C. Application of high pressure may be necessary in order to achieve reaction of ketones.

Production of the Baylis-Hillman adducts mostly uses a tertiary amine or phosphine as catalyst (E1), for example trimethylamine, triethylamine, tri-n-butylamine, ethyldiisopropylamine, methyldiisopropylamine, N-methylmorpholine, N-methylpiperidine, triethanolamine, N,N-dimethylethanolamine, 4-dimethylaminopyridine, 1,5-diazabicyclo[4.3.0]non-5-ene (DBN), 1,8-diazabicyclo[5.4.0]undec-7-ene (DBU), pyrrocoline, quinuclidine, 3-hydroxyquinuclidine, quinidine, trimethylphosphine, triethylphosphine, tri-n-butylphosphine, dimethylphenylphosphine, and preferably 1,4-diazabicyclo[2.2.2]octane (DABCO), 1,5-diazabicyclo[4.3.0]non-5-ene (DBN), 1,8-diazabicyclo[5.4.0]undec-7-ene (DBU), quinuclidine and 3-hydroxyquinuclidine, particularly preferably 1,4-diazabicyclo[2,2,2]octane (DABCO), and 3-hydroxyquinuclidine.

Quantities generally used of the catalyst are from 1 to 100 mol %, based on acrylic groups, preferably from 2 to 50 mol %, particularly preferably from 3 to 40 mol %, and very particularly preferably from 5 to 30 mol %.

The addition reaction can be catalyzed homogeneously or heterogeneously by a catalyst bound to a support. In one preferred embodiment, the catalyst is removed from the reaction mixture after the addition reaction, for example via ion exchanger, neutralization, or extraction.

It is moreover possible to use, in addition to the amine catalysts or phosphine catalysts mentioned, quantities of up to 5% by weight, preferably from 0.1 to 3% by weight, particularly preferably from 0.2 to 2% by weight, of at least one cocatalyst, which can be an alcohol or phenol. The phenols are not only phenol but preferably those phenols that bear at least one alkyl chain on the aromatic ring.

Preferred phenols are alkylphenols, for example o-, m-, or p-cresol (methylphenol), 2-tert-butyl-4-methylphenol, 6-tert-butyl-2,4-dimethylphenol, 2,6-di-tert-butyl-4-methylphenol, 2-tert-butylphenol, 4-tert-butylphenol, 2,4-di-tert-butylphenol, 2-methyl-4-tert-butylphenol, 4-tert-butyl-2,6-dimethylphenol, or 2,2'-methylenebis(6-tert-butyl-4-methylphenol), 4,4'-oxydiphenyl, 3,4-methylenedioxydiphenol (Sesamol), 3,4-dimethylphenol, hydroquinone, pyrocatechol (1,2-dihydroxybenzene), 2-(1'-methylcyclohex-1'-yl)-4,6-dimethylphenol, 2- or 4-(1'-phenyleth-1'-yl)phenol, 2-tert-butyl-6-methylphenol, 2,4,6-tris-tert-butylphenol, 2,6-di-tert-butylphenol, 2,4-di-tert-butylphenol, 4-tert-butylphenol, dodecylphenol, undecylphenol, decylphenol, nonylphenol [11066-49-2], octylphenol [140-66-9], 2,6-dimethylphenol, bisphenol A, bisphenol F, bisphenol B, bisphenol C, bisphenol S, 3,3',5,5'-tetrabromobisphenol A, 2,6-di-tert-butyl-p-cresol, Koresin® from BASF SE, methyl 3,5-di-tert-butyl-4-hydroxybenzoate, 4-tert-butylpyrocatechol, 2-hydroxybenzyl alcohol, 2-methoxy-4-methylphenol, 2,3,6-trimethylphenol, 2,4,5-trimethylphenol, 2,4,6-trimethylphenol, 2-isopropylphenol, 4-isopropylphenol, 6-isopropyl-m-cresol, n-octadecyl β-(3,5-di-tert-butyl-4-hydroxyphenyl)propionate, 1,1,3-tris(2-methyl-4-hydroxy-5-tert-butylphenyl)butane, 1,3,5-trimethyl-2,4,6-tris(3,5-di-tert-butyl-4-hydroxy-benzyl) benzene, 1,3,5-tris(3,5-di-tert-butyl-4-hydroxybenzyl) isocyanurate, 1,3,5-tris(3,5-di-tert-butyl-4-hydroxyphenyl) propionyloxyethyl isocyanurate, 1,3,5-tris(2,6-dimethyl-3-hydroxy-4-tert-butylbenzyl) isocyanurate, or pentaerythritol tetrakis-[β-(3,5-di-tert-butyl-4-hydroxyphenyl)propionate], 2,6-di-tert-butyl-4-dimethylaminomethylphenol, 6-isobutyl-2,4-dinitrophenol, 6-sec-butyl-2,4-dinitrophenol, Irganox® 565, 1141, 1192, 1222 and 1425 from BASF, octadecyl 3-(3',5'-di-tert-butyl-4'-hydroxyphenyl)propionate, hexadecyl 3-(3',5'-di-tert-butyl-4'-hydroxyphenyl)propionate, octyl 3-(3',5'-di-tert-butyl-4'-hydroxyphenyl)propionate, 3-thia-1,5-pentanediol bis[(3',5'-di-tert-butyl-4'-hydroxyphenyl)propionate], 4,8-dioxa-1,11-undecanediol bis[(3',5'-di-tert-butyl-4'-hydroxyphenyl)propionate], 4,8-dioxa-1,11-undecanediol bis[(3'-tert-butyl-4'-hydroxy-5'-methylphenyl) propionate], 1,9-nonanediol bis[(3',5'-di-tert-butyl-4'-hydroxyphenyl)propionate], 1,7-heptanediamine bis[3-(3',5'-di-tert-butyl-4'-hydroxyphenyl)propionamide], 1,1-methanediamine bis[3-(3',5'-di-tert-butyl-4'-hydroxyphenyl) propionamide], 3-(3',5'-di-tert-butyl-4'-hydroxyphenyl) propionic hydrazide, 3-(3',5'-dimethyl-4'-hydroxyphenyl) propionic hydrazide, bis(3-tert-butyl-5-ethyl-2-hydroxyphen-1-yl)methane, bis(3,5-di-tert-butyl-4-hydroxyphen-1-yl)methane, bis[3-(1'-methylcyclohex-1'-yl)-5-methyl-2-hydroxyphen-1-yl]methane, bis(3-tert-butyl-2-hydroxy-5-methylphen-1-yl)methane, 1,1-bis(5-tert-butyl-4-hydroxy-2-methylphen-1-yl)ethane, bis(5-tert-butyl-4-hydroxy-2-methylphen-1-yl) sulfide, bis(5-tert-butyl-2-hydroxy-5-methylphen-1-yl) sulfide, 1,1-bis(3,4-dimethyl-2-hydroxyphen-1-yl)-2-methylpropane, 1,1-bis(5- tert-butyl-3-methyl-2-hydroxyphen-1-yl)butane, 1,3,5-tris [1'-(3",5"-di-tert-butyl-4"-hydroxyphen-1"-yl)-meth-1'-yl]-2,4,6-trimethylbenzene, 1,1,4-tris(5'-tert-butyl-4'-hydroxy-2'-methylphen-1'-yl)butane, alkoxyphenols, for example 2-methoxyphenol (guaiacol, pyrocatechol monomethyl ether), 2-ethoxyphenol, 2-isopropoxyphenol, 4-methoxyphenol (hydroquinone monomethyl ether), mono- or di-tert-butyl-4-methoxyphenol, 3,5-di-tert-butyl-4-hydroxyanisole, 3-hydroxy-4-methoxybenzyl alcohol, 2,5-dimethoxy-4-hydroxybenzyl alcohol (syringa alcohol), 4-hydroxy-3-methoxybenzaldehyde (vanillin), 4-hydroxy-3-ethoxybenzaldehyde (ethylvanillin), 3-hydroxy-4-methoxybenzaldehyde (isovanillin), 1-(4-hydroxy-3-methoxyphenyl)ethanone (acetovanillone), eugenol, dihydroeugenol, isoeugenol, or tocopherols, e.g. α-, β-, γ-, δ-, and ε-tocopherol, tocol, or α-tocopherol hydroquinone.

The stoichiometric ratio of acrylate groups to carbonyl compounds is generally 1:from 0.05 to 1.5, preferably 1:from 0.1 to 1.3, particularly preferably 1:from 0.2 to 1.0, and very particularly preferably 1:from 0.4 to 1.0.

The molar ratio of all of the more than difunctional compounds (Ax) and (By) to all of the difunctional compounds (A2) and (B2) is generally 1:from 0 to 5, preferably 1:from 0.1 to 4, particularly preferably 1:from 0.25 to 3, very particularly preferably 1:from 0.5 to 2, and in particular 1:from 0.8 to 1.5.

The reaction can be carried out in a solvent, and the following can preferably be used as solvent: water, petroleum ether, ligroin, toluene, benzene, xylene, tetrahydrofuran (THF), diethyl ether, dioxane, or else the acrylate used. It is also possible to carry out the reaction in the absence of any solvent.

If the acrylate is used as solvent, the resultant reaction mixture, comprising both the acrylate used and also α-(1'-hydroxyalkyl)acrylate, can be purified or used as it stands without separation of the acrylate, whereupon the acrylate functions as reactive diluent (D).

It is possible to omit any purification of the reaction mixture, but it is of course possible to purify the mixture via distillation, stripping, acidic, alkaline, or neutral washing, filtration, or the like.

One preferred embodiment uses the carbonyl compound in a substoichiometric ratio with respect to the acrylate groups, thus giving reaction mixtures which comprise the Baylis-Hillman product in a mixture with the acrylate used. Mixtures of this type can be used with advantage in coating compositions for radiation curing and/or dual-cure curing.

A feature of the polymers (S) using the possible reactants 2) to 9) listed above, in contrast to the polymers obtainable by using possible reactants 1), is that they are branched, whereas the polymers obtainable by using possible reactants 1) are linear. Preference is given to linear polymers obtainable by using possible reactants 1).

The degree of branching (DB) of a branched polymer is calculated as disclosed in H. Frey et al., Acta Polym. 1997, 48, 30-35; see formula (1) in that publication.

Formula (1) of Frey et al. defines the degree of branching as

DB [%]=$(D+T)/(D+L+T)$, multiplied by 100 where D, T, and L respectively are the proportions of branching, terminal, and linearly incorporated monomer units in the polymer.

The degree of branching of the branched polymers among the compounds (S) can by way of example be at least 5%, preferably at least 10%, particularly preferably at least 15%, very particularly preferably at least 20%, and in particular at least 25%. The degree of branching can be determined by way of example by NMR analysis with reference to model substances.

The degree of branching of a polymer with an ideally branched structure with no linear content is 100%, and the polymers of the invention are preferably obtainable in the form of (highly) branched polymers with a degree of branching up to 99.9%, particularly up to 99%, very particularly up to 98%, and in particular up to 95%.

The polymers (S) are generally colorless to amber-colored, and have good solubility in solvents, for example methanol, ethanol, dimethylformamide, dimethylacetamide, ethyl acetate, butyl acetate, tetrahydrofuran, acetone, 2-butanone, or toluene.

One preferred embodiment uses the carbonyl compounds in a substoichiometric ratio with respect to the compounds having acrylate groups, thus giving reaction mixtures which comprise the Baylis-Hillman product in a mixture with the acrylate used. Mixtures of this type can be used with advantage in compositions for radiation curing and/or dual-cure curing.

The curable composition comprises at least one compound (C) that bears at least two thiol groups. The quantity of compound (C) in the curable composition is preferably from 10 to 70% by weight, or from 20 to 70% by weight, or from 25 to 60% by weight, or from 40 to 60% by weight. In the invention the compound (C) has at least two thiol groups, preferably from two to 20, particularly preferably from two to 15, particularly preferably from two to twelve, in particular from three to ten, and specifically from four to six. In the invention, the expression mercapto groups or thiol groups means —SH groups, particularly those bonded to tertiary carbon atoms, to methine groups, or to methylene groups, particularly preferably those bonded to methylene groups.

The number-average molar mass $M_n$ of preferred compounds (C) is at least 400 g/mol. A molar mass $M_n$ that should not be exceeded is preferably 5000 g/mol; $M_n$ is with preference not more than 4500 g/mol, with particular preference not more than 4000 g/mol, with very particular preference not more than 3500 g/mol, and in particular not more than 3000 g/mol. By virtue of the stated molar mass it is possible to minimize the volatility and the typical odor of the mercapto compounds.

Compounds (C) of this type are preferably obtainable via reaction of polyalcohols with at least one ester of carboxylic acids bearing thiol groups. It is preferable that the compounds (C) are compounds (C1) of the formula

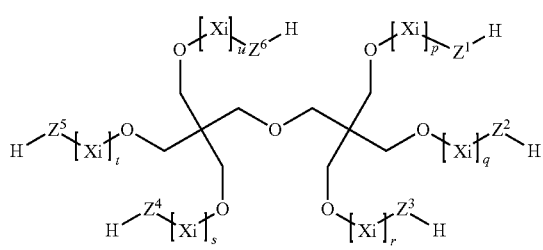

or compounds (C2) of the formula

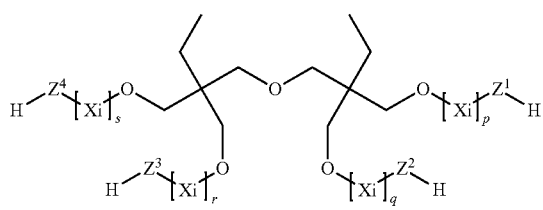

or compounds (C3) of the formula

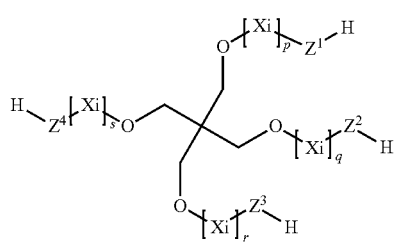

in which $Z^1$, $Z^2$, $Z^3$, $Z^4$, $Z^5$ and $Z^6$ are in each case mutually independently a sulfur atom or a moiety of the formula —(C=O)-$R^3$—S—, $R^3$ is a divalent $C_1$- to $C_6$-alkylene moiety, p, q, r, s, t, u are in each case mutually independently zero or a positive integer from 1 to 5, preferably zero or a positive integer from 1 to 4, and particularly preferably zero or a positive integer from 1 to 3, and very particularly preferably zero, each $X_i$ for i=from 1 to p, from 1 to q, from 1 to r, from 1 to s, from 1 to t and from 1 to u can be selected mutually independently from the group consisting of —CH$_2$—CH$_2$—O—, —CH$_2$—CH(CH$_3$)—O—, —CH(CH$_3$)—CH$_2$—O—, —CH$_2$—C(CH$_3$)$_2$—O—, —C(CH$_3$)$_2$—CH$_2$—O—, —CH$_2$—CHVin-O—, —CHVin-CH$_2$—O—, —CH$_2$—CHPh-O— and —CHPh-CH$_2$—O—, preferably from the group of —CH$_2$—CH$_2$—O—, —CH$_2$—CH(CH$_3$)—O— and —CH(CH$_3$)—CH$_2$—O—, and particularly preferably —CH$_2$—CH$_2$—O—, in which Ph is phenyl and Vin is vinyl, with the proviso that in the case of the compounds (C1) at least four, preferably at least five, and particularly preferably all six, of the moieties $Z^1$ to $Z^6$ are a group of the formula —(C=O)—$R^3$—S—, and in the case of the compounds (C2) and (C3) at least three, preferably all four, moieties $Z^1$ to $Z^4$ are a group of the formula —(C=O)—$R^3$—S—. The other moieties $Z^1$ to $Z^6$ and, respectively, $Z^1$ to $Z^4$ are then a single bond.

Examples of $R^3$ are methylene, 1,2-ethylene, 1,2-propylene, 1,3-propylene, 1,4-butylene, 1,5-pentylene and 1,6-hexylene, preferably methylene, 1,2-ethylene, 1,3-propylene, 1,4-butylene and 1,5-pentylene, particularly preferably methylene, and 1,2-ethylene.

The compounds (C) can moreover be compounds (C4) of functionality two or three of the formula

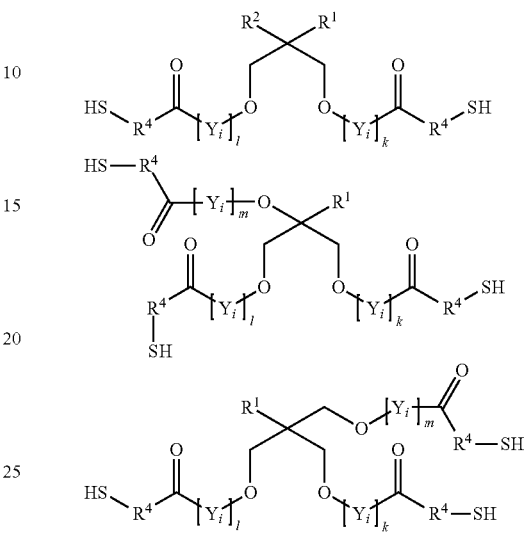

in which $R^1$ and $R^2$ are in each case mutually independently hydrogen or a $C_1$- to $C_4$-alkyl moiety, $R^4$ is methylene or 1,2-ethylene, k, l, m, n are in each case mutually independently zero or a positive integer from 1 to 5, preferably zero or a positive integer from 1 to 4, and particularly preferably zero or a positive integer from 1 to 3, each $Y_i$ for i=from 1 to k, from 1 to l, from 1 to m, and from 1 to n can be selected mutually independently from the group consisting of —CH$_2$—CH$_2$—O—, —CH$_2$—CH(CH$_3$)—O—, —CH(CH$_3$)—CH$_2$—O—, —CH$_2$—C(CH$_3$)$_2$—O—, —C(CH$_3$)$_2$—CH$_2$—O—, —CH$_2$—CHVin-O—, —CHVin-CH$_2$—O—, —CH$_2$—CHPh-O— and —CHPh-CH$_2$—O—, preferably from the group of —CH$_2$—CH$_2$—O—, —CH$_2$—CH(CH$_3$)—O— and —CH(CH$_3$)—CH$_2$—O—, and particularly preferably —CH$_2$—CH$_2$—O—, in which Ph is phenyl and Vin is vinyl.

Particularly preferred di- or trimercapto compounds (C4) here are the esterification products of 3-mercaptopropionic acid or mercaptoacetic acid with diols or triols, where the diols or triols are selected from the group consisting of ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentyl glycol, 1,2-, 1,3-, and 1,4-butanediol, 1,6-hexanediol, 1,10-decanediol, tetramethylcyclobutanediol, 1,2-, 1,3-, and 1,4-cyclohexanediol, 2-ethyl-1,3-hexanediol, 2,4-diethyloctane-1,3-diol, 2,2-bis(4-hydroxycyclohexyl)propane, 1,1-, 1,2-, 1,3-, and 1,4-cyclohexanedimethanol, 1,2-, 1,3-, and 1,4-cyclohexanediol, trimethylolbutane, trimethylolpropane, trimethylolethane, glycerol, and also alkoxylated, for example ethoxylated and/or propoxylated, preferably ethoxylated, products of these. It is preferable that the di- or trifunctional compounds (C4) are esterification products of 3-mercaptopropionic acid or mercaptoacetic acid with polyethylene glycol of molecular weight from 106 to 2000, polypropylene glycol of molecular weight from 134 to 2500, polyTHF of molecular weight from 162 to 2000, optionally ethoxylated trimethylolpropane of molecular weight from 134 to 1500, or optionally ethoxylated glycerol of molecular weight from 92 to 1100. It is particularly preferable that the di- or trifunctional compounds (C4) are 3-mercaptopropionic ester based on polypropylene glycol of molecular weight 2200 (PPGMP 2200), 3-mercaptopropionic ester based on polypropylene glycol of molar mass 800 (PPGMP 800), ethoxylated trimethylolpropane tri(3-mercaptopropionate) 1300 (ETTMP 1300), ethoxylated trimethylolpropane tri(3-mercaptopropionate) 700 (ETTMP 700), trimethylolpropane trimercaptoacetate (TMPMA), glycol di(3-mercaptopropionate) (GDMP), trimethylolpropane tri(3-mercaptopropionate) (TMPMP). Preferred compounds of this type having two or three mercapto groups are selected from the group consisting of ethylene glycol di(3-mercaptopropionate) (GDMP), trimethylolpropane tri(3-mercaptopropionate) (TMPMP), trimethylolpropane trimercaptoacetate (TMPMA), 3-mercaptopropionic ester of poly-1,2-propylene glycol of molar mass from 500 to 2500 g/mol, or 3-mercaptopropionic ester of ethoxylated trimethylolpropane of molar mass up to 1500 g/mol.

Examples of higher-functionality compounds (C1) to (C3) are pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate, and also alkoxylated, for example ethoxylated and/or propoxylated, preferably ethoxylated, products of these. Preferred compounds (C1) to (C3) are pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate, particularly pentaerythritol tetra(3-mercaptopropionate) (PETMP), pentaerythritol tetramercaptoacetate (PETMA), dipentaerythritol hexa(3-mercaptopropionate), dipentaerythritol hexamercaptoacetate, ditrimethylolpropane tetra(3-mercaptopropionate), ditrimethylolpropane tetramercaptoacetate, and very particularly pentaerythritol tetra(3-mercaptopropionate) (PETMP) and pentaerythritol tetramercaptoacetate (PETMA).

The coating composition of the invention can optionally comprise at least one reactive diluent (D) with number-average molar mass $M_n$ preferably less than 1000 g/mol, with preference less than 750 g/mol, and with particular preference less than 500 g/mol, preferably having at least two (meth)acrylate groups. Examples of other reactive diluents are those having epoxy groups, in particular glycidyl ethers: not only monoglycidyl ethers but also polyglycidyl ethers. Reactive diluents are low-viscosity additives that are liquid at room temperature. Lower viscosity of the reactive resin composition achieves better penetration into porous materials (saturation of woven fabrics, coating of concrete), or improves processability via transfer molding (e.g. RTM processes). Secondly, reactive resin compositions of this type permit higher filler loading, giving less volume shrinkage on curing. The mechanical properties of the cured resin can likewise be improved, as also can the cost-effectiveness of same. The reactive diluents can react with the polymers and can become bonded covalently to the polymer, and are therefore then no longer able to migrate.

Examples of reactive diluents include (meth)acrylate monomers and (meth)acrylate oligomers, for example beta-carboxyethyl acrylate, butyl acrylate, 2-ethylhexyl acrylate, octyl acrylate, isooctyl acrylate, nonyl acrylate, isononyl acrylate, decyl acrylate, isodecyl acrylate, octyl-decyl acrylate (ODA), benzyl acrylate, cyclohexyl acrylate, tert-butylcyclohexyl acrylate, phenoxyethyl acrylate, ethoxylated phenoxyethyl acrylate, propoxylated phenoxyethyl acrylate, nonylphenoxyethyl acrylate, butoxyethyl acrylate, lauryl acrylate, isobornyl acrylate, dihydrocyclopentadienyl acrylate, tetrahydrofuryl acrylate, ethoxyethyl acrylate, urethane acrylate, epoxy acrylate, hexanediol diacrylate (HDDA), tripropylene glycol diacrylate, diethylene glycol diacrylate (DEGDA), trimethylolpropane triacrylate (TMPTA), triethylene glycol diacrylate (TEGDA), butanediol diacrylate (BDDA), dipropylene glycol diacrylate (DPGDA) and n-pentane glycol diacrylate (NPGDA). Examples of further reactive diluents are glycidyl methacrylate (GMA), 1,6-hexanediol dimethacrylate (HDDMA), ethylene glycol dimethacrylate (EGDMA), propylene glycol dimethacrylate (PGDMA), cyclohexane dimethacrylate, butanediol dimethacrylate, diethylene glycol dimethacrylate, triethylene glycol dimethacrylate, isobornyl methacrylate, methyl methacrylate (MMA), ethoxylated trimethylolpropane trimethacrylate, and trimethylolpropane trimethacrylate (TMPTMA).

The material can additionally also comprise nonreactive diluents (solvents), examples of quantities of these being from 0 to 5% by weight, based on the entire composition. It is preferable that these solvents have a high boiling point. Examples of solvents are fatty acid esters, xylene, tetrahydrofuran, methyl tert-butyl ether, ethyl acetate, methyl ethyl ketone, etc.

It is preferable that the quantity of compound (D) in the curable composition is from 0 to 60% by weight, or from 0 to 50% by weight, or from 1 to 50% by weight, or from 5 to 30% by weight, or from 10 to 40% by weight.

It is preferable that the at least one, preferably from one to four, particularly preferably from one to three, very particularly preferably from one to two, and very particularly preferably precisely one, radiation-curable compound (s) (D) having at least 2 acryloyl or methacryloyl groups, preferably from two to ten, particularly preferably from two to six, very particularly preferably from three to four acryloyl or methacryloyl groups, preferably acryloyl groups, is (meth)acrylic ester of polyols, preferably of alkoxylated polyols.

Examples of (meth)acrylic esters of polyols are ethylene glycol diacrylate, 1,2-propanediol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentyl glycol diacrylate, 1,1-, 1,2-, 1,3-, and 1,4-cyclohexanedimethanol diacrylate, 1,2-, 1,3-, and 1,4-cyclohexanediol diacrylate, trimethylolpropane triacrylate, ditrimethylolpropane penta- and -hexaacrylate, pentaerythritol tri- and -tetraacrylate, glycerol di- and -triacrylate, and also di- and polyacrylates of sugar alcohols, for example sorbitol, mannitol, diglycerol, threitol, erythritol, adonitol (ribitol), arabitol (lyxitol), xylitol, dulcitol (galactitol), maltitol, and isomalt.

Preference is given to (meth)acrylates of compounds of the formula (VIIa) to (VIId),

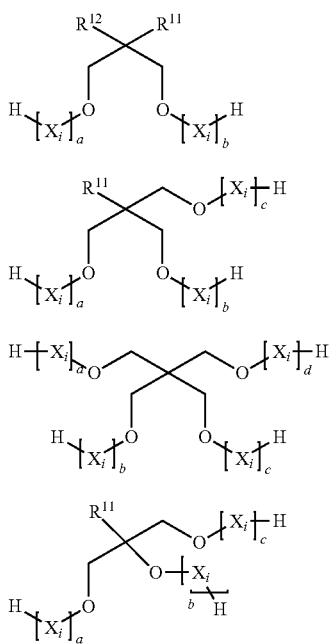

in which

R[11] and R[12] are mutually independently hydrogen or optionally aryl-, alkyl-, aryloxy-, alkyloxy-, heteroatom-, and/or heterocycle-substituted $C_1$-$C_{18}$-alkyl, a, b, c, d are mutually independently in each case an integer from 1 to 10, preferably from 1 to 5, and particularly preferably from 1 to 3, and each $X_i$ for i=from 1 to a, from 1 to b, from 1 to c, and from 1 to d can be selected mutually independently from the group of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O— and —CHPh-$CH_2$—O—, preferably from the group of —$CH_2$—$CH_2$—O—, —$CH_2$—$CH(CH_3)$—O—, and —$CH(CH_3)$—$CH_2$—O—, and particularly preferably —$CH_2$—$CH_2$—O—, in which Ph is phenyl, and Vin is vinyl.

The expression "optionally aryl-, alkyl-, aryloxy-, alkyloxy-, heteroatom-, and/or heterocycle-substituted $C_1$-$C_{18}$-alkyl" means by way of example methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, preferably methyl, ethyl, or n-propyl, very particularly methyl or ethyl.

Particular preference is given here to (meth)acrylates of zero- to six-fold ethoxylated, propoxylated, or mixed ethoxylated and propoxylated, and in particular only ethoxylated, glycerol, trimethylolpropane, ditrimethylolpropane, trimethylolethane, pentaerythritol, or dipentaerythritol. Very particular preference is given to trimethylolpropane triacrylate, pentaerythritol tetraacrylate, and acrylates of singly to six-fold alkoxylated, particularly preferably ethoxylated, trimethylolpropane, ditrimethylolpropane, glycerol, pentaerythritol, or dipentaerythritol. The compounds (D) can moreover be ethylene glycol diacrylate, 1,2-propanediol diacrylate, dipropylene glycol diacrylate, tripropylene glycol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentyl glycol diacrylate, 1,1-, 1,2-, 1,3-, or 1,4-cyclohexanedimethanol diacrylate, 1,2-, 1,3-, or 1,4-cyclohexanediol diacrylate.

The coating compositions of the invention are preferably constituted as follows:

(S) from 10 to 80% by weight, preferably from 40 to 75% by weight, (S1) and (S2) together from 0 to 80% by weight, preferably from 10 to 60% by weight, (C) from 10 to 70% by weight, preferably from 25 to 60% by weight, (D) from 0 to 60% by weight, preferably from 5 to 30% by weight, and (F) from 0 to 10% by weight, preferably from 0.1 to 5% by weight, with the proviso that the sum is always 100% by weight, where the stoichiometric ratio of thiol groups in (C) to acrylate groups in (S), (S1), and (S2) is preferably from 0.2:1 to 3.8:1, or from 0.8:1 to 2.5:1.

In order to accelerate the addition reaction between the thiol groups of component (C) onto the acrylate groups of components (S), (S1), and (S2), it is preferable that at least one catalyst (E) is present in the coating composition. Catalysts (E) that can be used to accelerate the addition reaction in the coating composition are primary, secondary, and tertiary amines, and also quaternary ammonium salts, imines, or iminium salts. These can be aliphatic or aromatic, preferably aliphatic. Preference is given to tertiary amine, for example trimethylamine, triethylamine, tri-n-butylamine, ethyldiisopropylamine, methyldiisopropylamine, N-methylmorpholine, N-methylpiperidine, triethanolamine, N,N-dimethylethanolamine, N-methyldicyclohexylamine, dimethylcyclohexylamine, diethylcyclohexylamine, methyldicyclohexylamine, ethyldicyclohexylamine, 4-N,N-dimethylaminopyridine, 1,5-diazabicyclo[4.3.0]non-5-ene (DBN), 1,8-diazabicyclo[5.4.0]undec-7-ene (DBU), tetramethylguanidine, pyrrocoline, quinuclidine, 3-hydroxyquinuclidine, quinidine, preferably 1,4-diazabicyclo[2.2.2]octane (DABCO), 1,5-diazabicyclo[4.3.0]non-5-ene (DBN), 1,8-diazabicyclo[5.4.0]undec-7-ene (DBU), N-methyldicyclohexylamine, quinuclidine, 3-aminoquinuclidine and 3-hydroxyquinuclidine, particularly N-methyldicyclohexylamine, 3-aminoquinuclidine, and 3-hydroxyquinuclidine.

The quantities preferably used of the catalyst are from 0.1 to 15% by weight, based on the entirety of (S) and (C), with preference from 0.2 to 10% by weight, with particular preference from 0.5 to 8% by weight, and with very particular preference from 1 to 5% by weight.

The curable compositions can moreover optionally comprise at least one photoinitiator (F) and/or optionally other additives typical for the respective application. The quantity of photoinitiator (F) in the curable composition is by way of example from 0 to 10% by weight, or from 0.1 to 8% by weight, preferably from 0.1 to 5% by weight, or from 0.1 to 2% by weight.

Photoinitiators (F) can by way of example be photoinitiators known to the person skilled in the art, for example those mentioned in "Advances in Polymer Science", vol. 14, Springer Berlin 1974, or in K. K. Dietliker, Chemistry and Technology of UV- and EB-Formulation for Coatings, Inks and Paints, vol. 3; Photoinitiators for Free Radical and Cationic Polymerization, P. K. T. Oldring (eds.), SITA Technology Ltd, London. Examples of those that can be used are mono- or bisacylphosphine oxides of the type described by way of example in EP-A 7 508, EP-A 57 474, DE-A 196 18 720, EP-A 495 751, or EP-A 615 980, for example 2,4,6-trimethylbenzoyldiphenylphosphine oxide (Lucirin® TPO from BASF SE), ethyl 2,4,6-trimethylbenzoylphenylphosphinate (Lucirin® TPO L from BASF SE), bis(2,4,6-trimethylbenzoyl)phenylphosphine oxide (Irgacure® 819 from BASF SE), benzophenones, hydroxyacetophenones, phenylglyoxylic acid, and derivatives thereof, or a mixture of these photoinitiators. The following may be mentioned as examples: benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, 3-methylanthraquinone, tert-butylanthraquinone, anthraquinonecarboxylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-diisopropylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7H-benzoin methyl ether, benz[de]anthracen-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, for example benzil dimethyl ketal, 2-methyl-1-[4-(methylthio)phenyl]2-morpholinopropan-1-one, anthraquinones such as 2-methylanthraquinone, 2-ethylanthraquinone, 2-tert-butylanthraquinone, 1-chloroanthraquinone, 2-amylanthraquinone, and 2,3-butanedione. Non- or low-yellowing photoinitiators of the phenylglyoxalic ester type, as described in DE-A 198 26 712, DE-A 199 13 353, or WO 98/33761, are also suitable. Among these photoinitiators preference is given to 2,4,6-trimethylbenzoyldiphenylphosphine oxide, ethyl 2,4,6-trimethylbenzoylphenylphosphinate, bis(2,4,6-trimethylbenzoyl)phenylphosphine oxide, benzophenone, 1-benzoylcyclohexan-1-ol, 2-hydroxy-2,2-dimethylacetophenone, and 2,2-dimethoxy-2-phenylacetophenone.

The invention also provides the production of moldings from the cured composition of the invention. In one preferred embodiment here the composition of the invention is introduced by means of VARTM technology into the mold for hardening to give the molding.

The present invention further provides the cured composition, obtainable or obtained via hardening of the composition of the invention. For this, the compositions of the invention are either charged to specific molds or applied to surfaces, and hardened via temperature increase.

The composition, in particular for application to surfaces, can also comprise further fillers. These fillers are selected from the group of the thixotropizing agents (e.g. hydrophilic and hydrophobic fumed silicas), UV stabilizers (e.g. nanoscale oxides such as titanium dioxide and zinc oxide), flame retardants (e.g. polyphosphates and phosphorus), silicates, and carbonates for improving mechanical properties. The material can comprise said fillers either in components (a) and/or (b) and/or in the thiol-hardener component (c). However, they can also be admixed as separate component of the composition of the invention.

The molds used, into which the composition of the invention is introduced, can comprise fiber reinforcing material or else elements that require protection from environmental effects such as wet conditions, oxygen, dust grains, or other aggressive materials or effects.

Curing of the composition of the invention gives cured resins, which can be produced either within a mold or else without restriction, with no use of molds of any type. Preferred cured resins are those hardened in a part of a mold. Said parts of a mold are selected from the group of parts of a mold for motor vehicles, aircrafts, ships, boats, sports items, and rotor blades for wind turbines. The design of said mold parts can include, or else not include, a fiber reinforcing material, and/or the composition of the invention can also comprise fiber reinforcing materials.

The fiber reinforcing materials can by way of example be woven fabrics, uni- or multiaxial laid scrims, nonwovens, or short fibers made of the following fiber materials: glass fibers, carbon fibers, aramid fibers, PE fibers (Dyneema), or basalt fibers. Preference is given to woven fabrics and uni- and multiaxial laid scrims made of glass fibers and carbon fibers. In the case of large fiber-reinforced components, it is preferable that the design of the components includes the fiber reinforcing material. Particular preference is given to uni- and multiaxial laid scrims made of glass fibers.

An advantage of the present invention is that at room temperature the curable compositions do not harden or harden only very slowly, and exhibit a stepped hardening profile, and can therefore be used advantageously in injection-molding processes.

They can in particular be used for the production of polymer composite materials based on reactive resins. Examples of polymer composite materials are fiber composite materials, for example glass fiber composite materials and carbon fiber composite materials. The invention therefore also provides polymer composite materials of this type, in particular fiber composite materials, produced with use of the curable compositions to be used in the invention.

Processes for the production of composites of this type are: injection molding, injection-compression molding, flow molding, reaction injection molding (RIM), infusion techniques such as RTM (resin transfer molding), VARTM (vacuum assisted RTM), tape layup processes, winding techniques, in particular coil coating, filament winding, manual lamination, and pultrusion. They can also be used generally in the form of heat-hardenable reactive resin with good hardening profile ("snap cure") and with excellent adhesion properties for, by way of example, heat-reactive adhesives (automotive: low cycle times), heat-hardening coatings, etc.

The composition of the invention can comprise additional further components, alongside components (S), (C), (D), and also optionally (E) and (F). These can be inter alia the following auxiliaries and additives: fillers, thixotropizing agents (e.g. hydrophilic and hydrophobic fumed silicas), UV stabilizers (e.g. nanoscale oxides such as titanium dioxide and zinc oxide), flame retardants (e.g. polyphosphates and phosphorus), silicates, and carbonates for improving mechanical properties.

The compositions to be used in the invention are obtainable, prior to application, via mixing at least of components (S) and (C), and also optionally additionally of components (S1), (S2), (D) and/or (F), and also optionally of other additives. It may be advisable here to mix the optional components (D) and/or (F), and/or further additives, into one of components (S) and (C), before said mixing begins, so that these can be held in inventory in the form of masterbatch formulation. In this case the production of the coating compositions of the invention becomes merely the mixing of two components. It is also possible to mix all of the components with the exception of the catalyst (E) with one another, and then to initiate the curing via addition of the catalyst (E) and mixing of same into the mixture.

The pot life of the composition after the mixing of the components and, respectively, addition of the catalyst (E) is preferably more than 4 hours at room temperature.

Pot life means the time during which the composition does not harden and retains sufficient flowability in relation to its use (e.g. injection molding, RTM, hot adhesive bonding).

Radiation curing can be achieved with high-energy light, e.g. UV light, or electron beams. Radiation curing can take place at relatively high temperatures. Preference is given here to a temperature above the $T_g$ of the radiation-curable binder. Examples of radiation sources suitable for the radiation curing process are low-pressure mercury sources, medium-pressure sources, high-pressure sources, and also fluorescent tubes, pulsed sources, metal halide sources, and electron flash equipment, permitting radiation curing without photoinitiator, and excimer sources. The radiation curing is achieved via exposure to high-energy radiation, i.e. UV radiation or daylight, preferably light in the wavelength range $\lambda$=from 200 to 700 nm, particularly preferably $\lambda$=from 200 to 500 nm, and very particularly preferably $\lambda$=from 250 to 400 nm, or via irradiation with high-energy electrons (electron beam; from 150 to 300 keV). Examples of radiation sources used are high-pressure mercury-vapor lamps, lasers, pulsed lamps (flash), LED lamps, halogen lamps, and excimer sources. The radiation dose that is usually sufficient for crosslinking is in the range from 80 to 3000 $mJ/cm^2$ for UV curing. It is also possible, of course, to use a plurality of radiation sources for the curing process, for example from two to four. These can also radiate in respectively different wavelength ranges. It is also optionally possible to carry out the irradiation with exclusion of oxygen, e.g. under inert gas. Preferred suitable inert gases are nitrogen, noble gases, carbon dioxide, and combustion gases. In another possible irradiation method, the coating composition is covered with transparent media. Examples of transparent media are plastics foils, glass, or liquids, for example water. Particular preference is given to irradiation in the manner described in DE-A1 199 57 900.

An advantage of the compositions to be used in the invention is that even when cured in an oxygen-containing atmosphere they provide good coating properties similar to those from curing of same in an inert atmosphere.

Unless otherwise stated, ppm data and percentage data used in this document are percentages by weight and ppm by weight.

The examples below are intended to illustrate the invention without restricting same to these examples.

EXAMPLES

Example 1: Production of the Binder of the Invention, Resin A

DABCO (1,4-diazabicyclo[2.2.2]octane; 0.0375 mol; 4.2065 g) was added to a suspension of 1,4-butanediol diacrylate (0.900 mol; 178.3942 g) and isophthalaldehyde (0.750 mol; 100.5990 g) in THF (150 ml). The resultant mixture was stirred at 50° C. for 48 h and then THF was removed in vacuo. The residue was taken up in ethyl acetate and washed with 10% HCl. The organic fraction was dried over $MgSO_4$, and the solvent was removed in vacuo (80° C., 1 mbar). The product was obtained in the form of a viscous, clear, and colorless liquid.

Example 2 (Comparison), Resin B

DABCO (0.075 mol; 8.413 g) was added to a suspension of 1,4-butanediol diacrylate (1.800 mol; 356.788 g) and terephthalaldehyde (1.500 mol; 201.198 g) in tetrahydrofuran (THF, 300 mL). The resultant mixture was stirred at 60° C. for 48 h. THF was then removed in vacuo. The remaining mixture was taken up in ethyl acetate and washed with 10% HCl in order to remove the catalyst residues. The organic fraction was then dried over magnesium sulfate ($MgSO_4$), and filtered, and the solvent was removed in vacuo. For further purification the mixture was treated at 80° C. and 1 mbar for 12 h.

Gel permeation chromatography (GPC) in THF with PMMA standard gave $M_w$ 1100 g/mol and $M_n$ 910 g/mol. The product was a clear, yellow viscous liquid.

Example 3: Hardening 9 g of resin $\lambda$=component 1 (binder)

10.4 g of pentaerythritol tetrakis(3-mercaptopropionate) (crosslinking agent) mixed with 170 mg of PC-Kat® NP112 (N-methyldicyclohexylamine, catalyst)=component 2

Components 1 and 2 were Mixed.

No hardening was observed at room temperature for >16 h (long pot life).

Very rapid hardening ("snap cure") takes place in less than 1 h at 70° C.

The product is a solid, transparent, clear and colorless material with Shore hardness 88 A and 56 D.

Example 4: Comparative Example 9 g of resin B=component 3 (binder)

10.4 g of pentaerythritol tetrakis(3-mercaptopropionate) (crosslinking agent) mixed with 80 mg of N-methyl-dicyclohexylamine (catalyst)=component 4

Component 3 was Mixed with Component 4.

After 2 h: tack-free hardening at room temperature; Shore A hardness 76.

When 170 mg of catalyst were used instead of 80 mg, tack-free curing in bulk takes place at room temperature within as little as 20 minutes in a highly exothermic reaction. This gives an irregular surface with many undesired blisters.

The use of the system of the invention therefore gives a longer pot life with a two-step hardening profile, whereas the comparative example hardens after only a short time at room temperature.

Example 5

The initial charge comprises a mixture made of 201 g (1.5 mol) of isophthalaldehyde, 148 g (0.5 mol) of trimethylolpropane triacrylate, 192 g (1.5 mol) of butyl acrylate, and 3.74 g (0.0333 mol) of DABCO. The mixture is stirred at 60° C. for 48 hours.

The product has low to moderate viscosity.

Gel permeation chromatography (THF): Mn=680; Mw=1220;

Polydispersity 1.8

Example 6: Hardening

Hardening was carried out with the components specified in Table 1, using the catalyst still present from example 5.

Hardening can be achieved in from 5 to 60 minutes (typically 30 minutes) at 70° C. or in from 1 to 5 minutes at 120° C.

The glass transition temperatures of the hardened products were as set out in table 1.

TABLE 1

|    | Polymer from ex. 5 [g] | BADGE [g] | PE-SH | TMP-SH | Tg [° C.] |
|----|------------------------|-----------|-------|--------|-----------|
| 6A | 10 | — | 10 | — | 50.0 |
| 6B | 10 | — | — | 10 | 40.3 |
| 6C | 10 | 10 | 10 | — | 21.5 |
| 6D | 10 | 10 | — | 10 | |

Tg: Glass transition temperature, determined via differential scanning calorimetry (ASTM 3418/82, "midpoint temperature")
BADGE: bisphenol A diglycidyl ether
PE-SH: pentaerythritol tetrakis(3-mercaptopropionate)
TMP-SH: trimethylolpropane tris(3-mercaptopropionate)

Example 7

The initial charge comprises a mixture made of 134 g (1 mol) of isophthalaldehyde, 396 g (2 mol) of butanediol diacrylate, and 8.98 g (0.08 mol) of DABCO. The mixture is stirred at 60° C. for 48 h.

The product is viscous.

Gel permeation chromatography (THF): Mn=770; Mw=1330;

Polydispersity 1.73

Example 8

1.44 g of benzoic acid were admixed with 80 g of product from example 7, and the mixture was stirred at 60° C. for 3 h.

Example 9

1.35 g of benzoic acid were mixed with 150 g of product from example 7, and the mixture was stirred at 60° C. for 2 h.

Example 10: Hardening

Hardening was carried out with the components specified in Table 2, using the catalyst still present respectively from examples 7 to 9.

Hardening can be achieved in from 5 to 60 minutes (typically 30 minutes) at 70° C. or in from 1 to 5 minutes at 120° C.

The glass transition temperatures of the hardened products were as set out in table 2.

TABLE 2

|     | Polymer from ex. 7 [g] | Polymer from ex. 8 [g] | Polymer from ex. 9 [g] | PE-SH | TMP-SH | Tg [° C.] |
|-----|-----|-----|-----|-----|-----|------|
| 10A | 10 | — | — | 10 | — | 38.0 |
| 10B | 10 | — | — | 8 | — | 45.8 |
| 10C | 10 | — | — | — | 10 | 25.2 |
| 10D | 10 | — | — | — | 8 | 16.5 |
| 10E | — | 10 | — | 10 | — | 26.1 |
| 10F | — | 10 | — | 8 | — | 17.3 |
| 10G | — | — | 10 | 10 | — | 35.3 |
| 10H | — | — | 10 | 8 | — | 22.2 |
| 10I | — | — | 10 | — | 10 | 11.7 |

The invention claimed is:

1. A process for the curing of curable compositions, the process comprising:
   providing at least one heat-curable composition, and
   hardening the composition by heating to temperatures greater than or equal to 60° C.,
   wherein the curable composition comprises:
   (a) from 10 to 80% by weight of at least one polymer (S) obtained by reaction of at least one compound having two aldehyde groups and of at least one acrylate compound (B) selected from the group consisting of acrylate compounds having more than two acrylate groups (By) and diacrylate compounds (B2),
   wherein the at least one compound having two aldehyde groups is an aromatic dialdehyde having a molecular structure wherein the bonds to the two aldehyde groups are at an angle to one another,
   (b) in total from greater than 0 to 80% by weight of at least one nonpolymeric compound selected from compounds (S1) having an α-(1'-hydroxyalkyl)acrylate group and compounds (S2) having two or more α-(1'-hydroxyalkyl)acrylate groups,
   (c) from 10 to 70% by weight of at least one compound (C) which bears at least two thiol groups,
   (d) from 0 to 60% by weight of at least one reactive diluent (D) having a number-average molar mass $M_n$ that is less than 1000 g/mol, and
   (f) from 0 to 10% by weight of at least one photoinitiator (F), wherein the sum is always 100% by weight, wherein the stoichiometric ratio of thiol groups in (C) to acrylate groups in (S), (S1), and (S2) is from 0.2:1 to 3.8:1.

2. The process according to claim 1, wherein the curable composition exhibits a viscosity increase of less than 100 000 mPa s within a period of 4 h at room temperature.

3. The process according to claim 1, wherein the compound having two or more aldehyde groups is selected from the group consisting of phthalaldehyde, isophthalaldehyde, and a mixture of these).

4. The process according to claim 1, wherein the diacrylate compounds (B2) are difunctional acrylates of one of alkanediols, cycloalkanediols, lower polyalkylene glycols and diamines, and wherein the acrylate compounds (By) are selected from the group consisting of polyether acrylates, polyester acrylates, acrylated polyacrylatols, urethane acrylates, and acrylic esters of alkoxylated polyols.

5. The process according to claim 1, wherein the acrylate compounds (By) and (B2) are selected from the group consisting of ethylene glycol diacrylate, 1,2-propanediol diacrylate, 1,3-propanediol diacrylate, 1,3-butanediol diacrylate, 1,4-butanediol diacrylate, 1,5-pentanediol diacrylate, 1,6-hexanediol diacrylate, 1,8-octanediol diacrylate, neopentyl glycol diacrylate, 1,1-cyclohexanedimethanol diacrylate, 1,2-cyclohexanedimethanol diacrylate, 1,3-cyclohexanedimethanol diacrylate, 1,4-cyclohexanedimethanol diacrylate, 1,2-cyclohexanediol diacrylate, 1,3-cyclohexanediol diacrylate, 1,4-cyclohexanediol diacrylate, diethylene glycol diacrylate, dipropylene glycol diacrylate, tripropylene glycol diacrylate, N,N'-bisacryloyl-2,2-diaminoethane, N,N'-bisacryloyl-1,6-diaminohexane, N,N'-bisacryloylpiperazine, trimethylolpropane triacrylate, ditrimethylolpropane pentaacrylate, ditrimethylolpropane hexaacrylate, pentaerythritol triacrylate, pentaerythritol tetraacrylate, glycerol diacrylate, glycerol triacrylate, di- or polyacrylates of sugar alcohols, di- or polyacrylates of polyester polyols, di- or polyacrylates of polyetherols, di- or polyacrylates of polyTHF with molecular weight from 162 to 2000, di- or polyacrylates of poly-1,3-propanediol with molecular weight from 134 to 1178, di- or polyacrylates of polyethylene glycol with molecular weight from 106 to 898, urethane di- and polyacrylates and polycarbonate di- and polyacrylates.

6. The process according to claim 1, wherein the acrylate compound is a diacrylate compound (B2) and is selected from the group consisting of ethylene glycol diacrylate, 1,2-propanediol diacrylate, 1,3-propanediol diacrylate, 1,4-butanediol diacrylate, and 1,6-hexanediol diacrylate.

7. The process according to claim 1, wherein the at least one compound (C) having at least two thiol groups are one of compounds (C1) of the formula

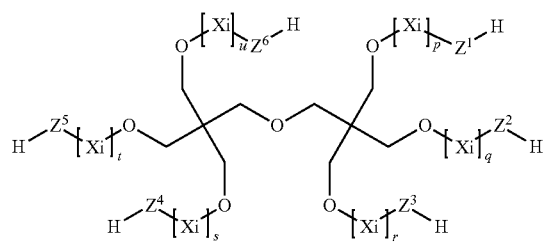

or compounds (C2) of the formula

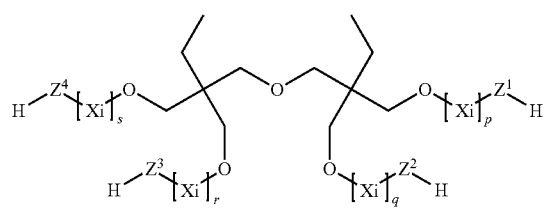

or compounds (C3) of the formula

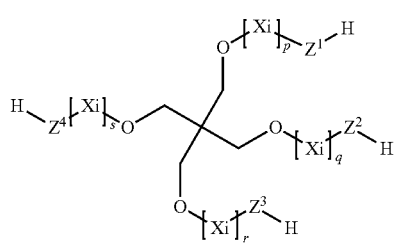

in which $Z^1$, $Z^2$, $Z^3$, $Z^4$, $Z^5$ and $Z^6$ are in each case mutually independently a single bond or a moiety of the formula —(C=O)—$R^3$—S—, $R^3$ is a divalent $C_1$- to $C_6$-alkylene moiety, p, q, r, s, t, u are in each case mutually independently zero or a positive integer from 1 to 5, each $X_i$ for i=from 1 to p, from 1 to q, from 1 to r, from 1 to s, from 1 to t and from 1 to u can be selected mutually independently from the group consisting of —$CH_2$—$CH_2$—O—, —$CH_2$—CH($CH_3$)—O—, —CH($CH_3$)—$CH_2$—O—, —$CH_2$—C($CH_3$)$_2$—O—, —C($CH_3$)$_2$—$CH_2$—O—, —$CH_2$—CHVin-O—, —CHVin-$CH_2$—O—, —$CH_2$—CHPh-O— and —CHPh-$CH_2$—O—, wherein Ph is phenyl and Vin is vinyl, wherein when the at least one compound (C) comprises compound (C1) at least four of the moieties $Z^1$ to $Z^6$ are a group of the formula —(C=O)—$R^3$—S—, and wherein when the at least one compound (C) comprises one of compounds (C2) or (C3) at least three moieties $Z^1$ to $Z^4$ are a group of the formula —(C=O)—$R^3$—S—.

8. The process according to claim 1, wherein the at least one compound (C) having at least two thiol groups is a di- or trifunctional compound (C4) of the formula

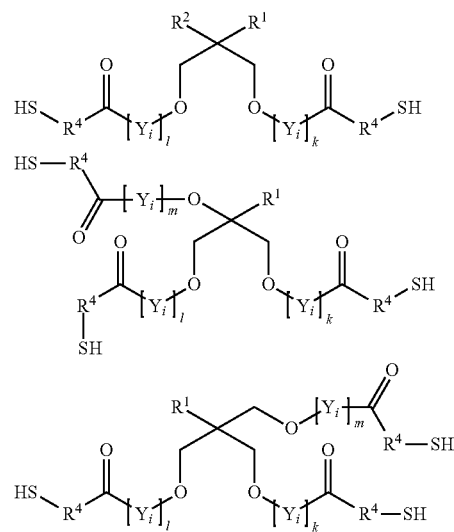

in which $R^1$ and $R^2$ are in each case mutually independently hydrogen or a $C_1$- to $C_4$-alkyl moiety, $R^4$ is methylene or 1,2-ethylene, k, l, m, n are in each case mutually independently zero or a positive integer from 1 to 5, each $Y_i$ for i=from 1 to k, from 1 to l, from 1 to m, and from 1 to n can be selected mutually independently from the group consisting of —$CH_2$—$CH_2$—O—, —$CH_2$—CH($CH_3$)—O—, —CH($CH_3$)—$CH_2$—O—, —$CH_2$—C($CH_3$)$_2$—O—, —C($CH_3$)$_2$—$CH_2$—O—, —$CH_2$—CHVin-O—, —CHVin-$CH_2$—O—, —$CH_2$—CHPh-O— and —CHPh-$CH_2$—O—, wherein Ph is phenyl and Vin is vinyl.

9. The process according to claim 1, wherein the at least one compound (C) is selected from the group consisting of ethylene glycol di(3-mercaptopropionate) (GDMP), trimethylolpropane tri(3-mercaptopropionate) (TMPMP), trimethylolpropane trimercaptoacetate (TMPMA), 3-mercaptopropionic ester of poly-1,2-propylene glycol with molar mass from 500 to 2500 g/mol, 3-mercaptopropionic ester of ethoxylated trimethylolpropane with molar mass up to 1500 g/mol, pentaerythritol tetra(3-mercapotopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate, and alkoxylated products of these.

10. The process according to claim 1, wherein the curable composition further comprises a catalyst (E) which accelerates the addition reaction between the thiol groups, wherein the catalyst (E) is selected from the group consisting of primary, secondary, and tertiary amines, primary, secondary, and tertiary phosphines, quaternary ammonium and phosphonium salts, imines, and iminium salts.

11. The process according to claim 1, further comprising producing polymer materials from the cured composition and by the process selected from the group consisting of injection molding, injection-compression molding, flow molding, reaction injection molding (RIM), RTM (resin transfer molding), VARTM (vacuum assisted RTM), tape layup processes, coil coating, filament winding, manual lamination, pultrusion, hot reactive adhesive bonding, and high-temperature-hardening coating processes.

12. The process according to claim 1, further comprising producing moldings from the cured composition, wherein the composition is introduced by means of VARTM technology into a mold for hardening to give the molding.

13. A curable composition, wherein the composition is curable via heating to temperatures greater than or equal to 60° C. and comprises:
   (a) from 10 to 80% by weight of at least one polymer (S) obtained by reaction of at least one compound having two aldehyde groups and of at least one acrylate compound (B) selected from the group consisting of acrylate compounds having more than two acrylate groups (By) and diacrylate compounds (B2), wherein the at least one compound having two aldehyde groups is an aromatic dialdehyde having a molecular structure wherein the bonds to the two aldehyde groups are at an angle to one another,
   (b) in total from greater than 0 to 80% by weight of at least one nonpolymeric compound selected from compounds (S1) having an α-(1'-hydroxyalkyl)acrylate group and compounds (S2) having two or more α-(1'-hydroxyalkyl)acrylate groups,
   (c) from 10 to 70% by weight of at least one compound (C) which bears at least two thiol groups,
   (d) from 0 to 60% by weight of at least one reactive diluent (D) having a number-average molar mass $M_n$ that is less than 1000 g/mol,
   (f) from 0 to 10% by weight of at least one photoinitiator (F), and
   wherein the sum is always 100% by weight, wherein the stoichiometric ratio of thiol groups in (C) to acrylate groups in (S), (S1), and (S2) is from 0.2:1 to 3.8:1.

14. The curable composition according to claim 13, wherein the at least one compound having two aldehyde groups is selected from the group consisting of phthalaldehyde, isophthalaldehyde, and a mixture of these.

15. A cured composition comprising:
   (a) from 10 to 80% by weight of at least one polymer (S) obtained by reaction of at least one compound having two aldehyde groups and of at least one acrylate compound (B) selected from the group consisting of acrylate compounds having more than two acrylate groups (By) and diacrylate compounds (B2), wherein the at least one compound having two aldehyde groups is an aromatic dialdehyde having a molecular structure wherein the bonds to the two aldehyde groups are at an angle to one another,
   (b) in total from greater than 0 to 80% by weight of at least one nonpolymeric compound selected from compounds (S1) having an α-(1'-hydroxyalkyl)acrylate group and compounds (S2) having two or more α-(1'-hydroxyalkyl)acrylate groups,
   (c) from 10 to 70% by weight of at least one compound (C) which bears at least two thiol groups,
   (d) from 0 to 60% by weight of at least one reactive diluent (D) having a number-average molar mass Mn that is less than 1000 g/mol, and
   (f) from 0 to 10% by weight of at least one photoinitiator (F),
   wherein the sum is always 100% by weight, wherein the stoichiometric ratio of thiol groups in (C) to acrylate groups in (S), (S1), and (S2) is from 0.2:1 to 3.8:1,
   wherein the cured composition is produced by a process comprising:
   providing at least one heat-curable composition, and hardening the composition by heating to temperatures greater than or equal to 60° C.

16. The cured composition according to claim 15, wherein the cured composition is a polymer composite material.

17. The cured composition according to claim 16, wherein the cured composition is one of a glass fiber composite material or a carbon fiber composite material.

18. The curable composition according to claim 13 further comprising:
   (b) at least one compound (S1) having an α-(1'-hydroxyalkyl)acrylate group,
   (d) at least one reactive diluent (D) with number-average molar mass Mn that is less than 1000 g/mol,
   (e) at least one catalyst (E) which accelerates the addition reaction between thiol groups and acrylate groups, and
   (f) at least one photoinitiator (F).

* * * * *